(12) United States Patent
Kodaira et al.

(10) Patent No.: US 10,450,223 B2
(45) Date of Patent: Oct. 22, 2019

(54) COATING SOLUTION FOR FORMING ULTRAVIOLET-ABSORBING FILM, AND ULTRAVIOLET-ABSORBING GLASS ARTICLE

(71) Applicant: AGC Inc., Tokyo (JP)

(72) Inventors: Hirokazu Kodaira, Tokyo (JP); Hiroyuki Tomonaga, Tokyo (JP)

(73) Assignee: AGC Inc., Tokyo (JP)

( * ) Notice: Subject to any disclaimer, the term of this patent is extended or adjusted under 35 U.S.C. 154(b) by 411 days.

(21) Appl. No.: 14/926,571

(22) Filed: Oct. 29, 2015

(65) Prior Publication Data

US 2016/0046522 A1 Feb. 18, 2016

Related U.S. Application Data

(63) Continuation of application No. 13/279,654, filed on Oct. 24, 2011, now abandoned, which is a continuation of application No. PCT/JP2010/058215, filed on May 14, 2010.

(30) Foreign Application Priority Data

May 15, 2009 (JP) .................................. 2009-118259

(51) Int. Cl.
*C03C 17/30* (2006.01)
*C09D 183/06* (2006.01)
*C08G 77/14* (2006.01)

(52) U.S. Cl.
CPC ............ *C03C 17/30* (2013.01); *C09D 183/06* (2013.01); *C03C 2217/74* (2013.01); *C08G 77/14* (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 3,360,391 A | 12/1967 | Simon et al. | |
| 4,051,161 A | 9/1977 | Proskow | |
| 4,156,046 A * | 5/1979 | Lien ..................... | C08G 59/145 428/220 |
| 4,328,346 A * | 5/1982 | Chung ..................... | B05D 7/02 522/25 |
| 5,013,608 A * | 5/1991 | Guest ................... | C09D 183/06 427/164 |
| 5,789,476 A | 8/1998 | Iryo et al. | |
| 6,190,777 B1 | 2/2001 | Asano et al. | |
| 6,214,416 B1 | 4/2001 | Sakagami et al. | |
| 6,497,964 B1 * | 12/2002 | Matsumura .............. | C09D 4/00 106/287.1 |
| 6,696,515 B2 * | 2/2004 | Yamaya ................... | C08J 7/047 351/159.57 |
| 7,351,477 B2 | 4/2008 | Yamaya et al. | |
| 2003/0020049 A1 | 1/2003 | Payne et al. | |
| 2003/0203991 A1 | 10/2003 | Schottman et al. | |
| 2007/0128449 A1 | 6/2007 | Taylor et al. | |
| 2009/0104447 A1 * | 4/2009 | Kita .......................... | C08J 7/04 428/412 |
| 2015/1016366 | 7/2015 | Kodaira et al. | |

FOREIGN PATENT DOCUMENTS

| | | |
|---|---|---|
| DE | 2 346 419 A1 | 3/1974 |
| JP | 49-75561 | 7/1974 |
| JP | 4-46975 A | 2/1992 |
| JP | 5-339033 A | 12/1993 |
| JP | 7-267682 A | 10/1995 |
| JP | 8-48940 A | 2/1996 |
| JP | 8-290941 A | 11/1996 |
| JP | 9-227830 A | 9/1997 |
| JP | 10-265241 A | 10/1998 |
| JP | 2000-144051 | 5/2000 |
| JP | 2001-089710 | 4/2001 |
| JP | 2004-148641 | 5/2004 |
| JP | 2004-317539 | 11/2004 |

(Continued)

OTHER PUBLICATIONS

Article by James E. Pickett et al (1996).*
RN1843-05-6 ACS (2018).*
RN56-81-5 ACS (2014).*
Office Action dated May 10, 2016 in Japanese Patent Application No. 2015-126658 (with unedited computer generated English language translation).
U.S. Appl. No. 13/676,651, filed Nov. 14, 2012, US2013/0071669 A1, Kodaira, et al.
U.S. Appl. No. 14/035,339, filed Sep. 24, 2013, US2014/0023860 A1, Kodaira, et al.

(Continued)

*Primary Examiner* — Kenneth J Stachel

(74) *Attorney, Agent, or Firm* — Oblon, McClelland, Maier & Neustadt, L.L.P.

(57) ABSTRACT

To provide a coating solution for forming an ultraviolet-absorbing film which has mechanical durability such as abrasion resistance and which is little susceptible to deterioration of the ultraviolet-absorbing ability by use for a long period of time, and an ultraviolet-absorbing glass article having an ultraviolet-absorbing film formed by using such a coating solution, which has mechanical durability such as abrasion resistance and which is little susceptible to deterioration of the ultraviolet-absorbing ability by use for a long period of time. A coating solution which comprises a component derived from an epoxidized organooxysilane compound, a component derived from an organooxysilane compound which is a reaction product of a hydroxylated benzophenone compound and an epoxidized organooxysilane compound, and a component derived from an organooxysilane compound other than the above both organooxysilane compounds, and an ultraviolet-absorbing glass article obtained by using the coating solution.

11 Claims, No Drawings

(56) References Cited

FOREIGN PATENT DOCUMENTS

| JP | 2004-341052 | 12/2004 | | |
|---|---|---|---|---|
| JP | 2005-298572 | 10/2005 | | |
| JP | 2008-139733 | 6/2008 | | |
| JP | 2008-266050 A | 11/2008 | | |
| WO | WO 2006/137454 | 12/2006 | | |
| WO | WO-2007105741 A1 * | 9/2007 | ................ | C08J 7/04 |

OTHER PUBLICATIONS

International Search Report dated Jun. 15, 2010 in PCT/JP2010/058215 filed May 14, 2010.
DENACOL™ Aliphatic Epoxies at http://nagaseamerica.com/product/denacol-alilphatic-epoxies-5 accessed Jan. 15, 2015 (4 pp.).
Extended European Search Report dated Feb. 4, 2015 in European Patent Application No. 10775001.0.
Benzoic Acid Properties from Merck Index, 2012 Merck Sharp & Dohme Corp., a subsidiary of Merck & Co., Inc., Whitehouse Station, N.J., U.S.A. © 2006.
CAS Registry No. 56-81-5 American Chem Soc (2014).

\* cited by examiner

COATING SOLUTION FOR FORMING ULTRAVIOLET-ABSORBING FILM, AND ULTRAVIOLET-ABSORBING GLASS ARTICLE

CROSS-REFERENCE TO RELATED APPLICATIONS

The present application is a continuation application of U.S. patent application Ser. No. 13/279,654 filed Oct. 24, 2011, which in turn a continuation application of International Application No. PCT/JP10/058215, filed May 14, 2010, which claims priority to Japanese Patent Application No. 2009-118259, filed May 15, 2009. The contents of these applications are incorporated herein by reference in their entirety.

TECHNICAL FIELD

The present invention relates to a coating solution for forming an ultraviolet-absorbing film on the surface of an article such as glass, and an ultraviolet-absorbing glass article having an ultraviolet-absorbing film formed by using such a coating solution.

BACKGROUND ART

In recent years, it has been attempted that on a transparent substrate such as window glass for a vehicle such as an automobile or window glass for a house or building, an ultraviolet-absorbing film is formed as a coating film which has an ability to absorb ultraviolet rays entering into the vehicle or room therethrough and which has mechanical durability such as abrasion resistance.

In order to obtain an ultraviolet-absorbing coating film having high abrasion resistance and ultraviolet-absorbing ability, it has been attempted to form a silica-type ultraviolet-absorbing film on a substrate by using a coating solution having an organic ultraviolet-absorbing agent blended to a silane compound. For example, Patent Document 1 discloses that a coating solution comprising a silicon alkoxide and a water-soluble organic polymer such as polyethylene glycol and further containing an ultraviolet absorber or an organic colorant, is applied on a glass plate, followed by curing to obtain an ultraviolet-absorbing film made of an organic/inorganic composite film. However, with the silica-type ultraviolet-absorbing film as disclosed in Patent Document 1, absorption of long wavelength ultraviolet rays required by the present invention has not been accomplished although it has mechanical durability such as abrasion resistance, and if it is attempted to add the ultraviolet-absorber in a high concentration in order to absorb ultraviolet rays having long wavelengths, there have been problems such that deterioration in the mechanical durability and bleeding out of the ultraviolet absorber from the film under high humidity tend to occur, whereby the ultraviolet-absorbing ability cannot be maintained for a long period of time.

As a technique to solve the problem of bleeding out of the ultraviolet absorber in the silica type ultraviolet-absorbing film, Patent Document 2 discloses an attempt to form a silica-type ultraviolet-absorbing film by using a coating solution having blended to a silane compound a reaction product of a silane compound with an organic compound having an ultraviolet-absorbing ability. The silica-type ultraviolet-absorbing film as disclosed in Patent Document 2 is free from bleeding out of the ultraviolet absorber from the film and may accomplish absorption of the long wavelength ultraviolet rays desired by the present invention, but it has had a problem that cracking resistance and abrasion resistance are not sufficient especially when such a silica-type ultraviolet-absorbing film is formed on glass.

Therefore, an ultraviolet-absorbing film has been desired which is less susceptible to deterioration of the ultraviolet-absorbing ability by use for a long period of time, while securing mechanical durability such as abrasion resistance.

PRIOR ART DOCUMENTS

Patent Documents

Patent Document 1: WO2006/137454
Patent Document 2: JP-A-2001-89710

DISCLOSURE OF INVENTION

Technical Problem

The present invention has been made to solve the above problem, and it is an object of the present invention to provide a coating solution for forming an ultraviolet-absorbing film which has mechanical durability such as abrasion resistance and which is little susceptible to deterioration of the ultraviolet-absorbing ability by use for a long period of time, and an ultraviolet-absorbing glass article having an ultraviolet-absorbing film which is formed by using such a coating solution and which has mechanical durability such as abrasion resistance and is little susceptible to deterioration of the ultraviolet-absorbing ability by use for a long period of time.

Solution to Problem

The present invention provides a coating solution for forming an ultraviolet-absorbing film and an ultraviolet-absorbing glass article having the following constructions.

[1] A coating solution for forming an ultraviolet-absorbing film, which comprises a combination of the following three components:
  a component derived from an epoxidized organooxysilane compound (a),
  a component derived from an organooxysilane compound (b) which is a reaction product of a hydroxylated benzophenone compound and an epoxidized organooxysilane compound, and
  a component derived from an organooxysilane compound (c) other than the above (a) and (b),
wherein each of the above three components is the corresponding organooxysilane compound of the above (a), (b) or (c), or a constituting component of a partially hydrolyzed condensate of at least the corresponding organooxysilane compound of the above (a), (b) or (c).

[2] The coating solution for forming an ultraviolet-absorbing film according to [1], wherein the proportions of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b) are such proportions that, based on 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b), the component derived from the organooxysilane compound (a) is from 5 to 50 parts by mass, the component derived from the organooxysilane compound (b) is from 10 to 50 parts by mass, and the component derived from the organooxysilane compound (c) is from 40 to 80 parts by mass.

[3] The coating solution for forming an ultraviolet-absorbing film according to [1] or [2], which contains at least one member selected from polyepoxides and glycerin.

[4] The coating solution for forming an ultraviolet-absorbing film according to [3], wherein the content of said at least one member selected from polyepoxides and glycerin is from 0.1 to 20 parts by mass, based on 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b).

[5] The coating solution for forming an ultraviolet-absorbing film according to any one of [1] to [4], which contains an acid having a primary proton pKa of from 1.0 to 5.0 in a proportion of from 0.005 to 5.0 mol/kg as the molar concentration, based on the total mass of the coating solution, of the proton when the primary proton of the acid is completely dissociated.

[6] The coating solution for forming an ultraviolet-absorbing film according to any one of [1] to [5], which contains fine particles of silica in a proportion of from 0.5 to 50 parts by mass, based on 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b), and water in a proportion of from 8 to 20 equivalents by molar ratio to the amount, calculated as $SiO_2$, of the component derived from the organooxysilane compound (c).

[7] The coating solution for forming an ultraviolet-absorbing film according to any one of [1] to [6], wherein the content of the component derived from the organooxysilane compound (c) is from 1 to 10 mass % as the $SiO_2$ content when silicon atoms contained in this component are calculated as $SiO_2$.

[8] An ultraviolet-absorbing glass article comprising a glass substrate and an ultraviolet-absorbing film formed on at least part of the glass substrate surface by using the coating solution for forming an ultraviolet-absorbing film as defined in any one of [1] to [7].

[9] The ultraviolet-absorbing glass article according to [8], wherein the transmittance of light having a wavelength of 380 nm through the glass article is at most 7.0%.

[10] The ultraviolet-absorbing glass article according to [8] or [9], wherein when an abrasion test of 1,000 rotations with a CS-10F abrasive wheel is applied against the surface of the ultraviolet-absorbing film in accordance with JIS-R3212 (1998), the increase in the haze after the test as compared to before the test is at most 5.0%.

Advantageous Effects of Invention

By using the coating solution for forming an ultraviolet-absorbing film of the present invention, it is possible to form an ultraviolet-absorbing film which has mechanical durability such as abrasion resistance and which is little susceptible to deterioration of the ultraviolet-absorbing ability by use for a long period of time, and the ultraviolet-absorbing glass article having such an ultraviolet-absorbing film has durability for a long period of time with respect to not only the mechanical durability but also the ultraviolet-absorbing ability.

DESCRIPTION OF EMBODIMENTS

Now, the present invention will be described with reference to its embodiments.

[Coating Solution for Forming Ultraviolet-Absorbing Film of the Present Invention]

The coating solution for forming an ultraviolet-absorbing film of the present invention comprises a component derived from an epoxidized organooxysilane compound (a), a component derived from an organooxysilane compound (b) which is a reaction product of a hydroxylated benzophenone compound and an epoxidized organooxysilane compound (hereinafter referred to also as "silylated benzophenone compound", as the case requires), and a component derived from an organooxysilane compound (c) other than the above (a) and (b). Here, each of the above organooxysilane compounds (a) to (c) is a compound having at least two organooxy groups bonded to a silicon atom.

In the present invention, a component derived from an organooxysilane compound is, e.g. in the case of a component derived from an organooxysilane compound (a), meant for a component which includes not only the organooxysilane compound (a) itself but also a constituting unit of the organooxysilane compound (a) in a partially hydrolyzed condensate containing the organooxysilane compound (a) as the constituting unit or in a partially hydrolyzed co-condensate containing the organooxysilane compound (a) and the organooxysilane compound (b) and/or (c) as constituting units.

Therefore, the coating solution for forming an ultraviolet-absorbing film of the present invention may contain, as components derived respectively from the organooxysilane compounds (a) to (c), the organooxysilane compounds (a) to (c) themselves or the respective partially hydrolyzed condensates of the organooxysilane compounds (a) to (c). Otherwise, the coating solution for forming an ultraviolet-absorbing film of the present invention may contain a partially hydrolyzed co-condensate of optional two types among the organooxysilane compounds (a) to (c), and the remaining one type. Otherwise, the coating solution for forming an ultraviolet-absorbing film of the present invention may contain a partially hydrolyzed co-condensate of the three types of the organooxysilane compounds (a) to (c). Such a partially hydrolyzed condensate or partially hydrolyzed co-condensate will be described later in the description of each organooxysilane compound.

In a finally cured product of the organooxysilane compounds (a) to (c), the organooxysilane compounds (a) to (c) as well as the constituting units of the organooxysilane compounds (a) to (c) which constitute the above mentioned partially hydrolyzed condensate or partially hydrolyzed co-condensate, are considered to become the same cured product-constituting units. It is essential for the coating solution for forming an ultraviolet-absorbing film of the present invention to comprise, in combination, the respective components derived from three types of the organooxysilane compounds (a) to (c) irrespective of whether they are organooxysilane compounds themselves or constituting units in the partially hydrolyzed condensates or partially hydrolyzed co-condensates.

<Epoxidized Organooxysilane Compound (a)>

The epoxidized organooxysilane compound (a) in the present invention is not particularly limited so long as it is an organooxysilane compound having an epoxidized organic group bonded to a silicon atom, but preferably, an organooxysilane compound represented by the following formula (A) may be mentioned. Here, the organic compound bonded to a silicon atom is meant for an organic group wherein an atom bonded to the silicon atom is a carbon atom. Further, hereinafter, the epoxidized organooxysilane compound (a) may be referred to also as an organooxysilane compound (a).

(A)

In the formula (A), $R^1$ is an epoxidized organic group, $R^2$ is a $C_{1-10}$ alkyl group or an aryl group, $R^3$ is a hydrogen atom or a $C_{1-10}$ monovalent hydrocarbon group which may contain an oxygen atom, a is 1 or 2, and b is 0 or 1, provided that a+b is 1 or 2.

In the above formula (A), $R^1$ is an epoxidized organic group, and the number of epoxy groups in the organic group or the type of the organic group itself is not particularly limited. Specifically, however, it may be a $C_{2-15}$ linear or branched alkyl group which may have an oxygen atom and which has one epoxy group or epoxy group-containing cycloalkyl group at its terminal. Among them, in the present invention, a 3-glycidoxypropyl group represented by the following formula (1-1), a 5,6-epoxyhexyl group represented by the following formula (1-2), a 9,10-epoxydecyl group represented by the following formula (1-3) and a 2-(3,4-epoxycyclohexyl)ethyl group represented by the following formula (1-4) are, for example, preferred, and from the viewpoint of the reactivity with a silane compound, the 3-glycidoxypropyl group and the 2-(3,4-epoxycyclohexyl)ethyl group are, for example, particularly preferred.

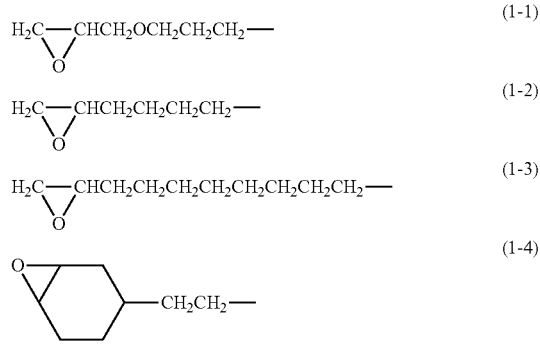

In the above formula (A), the number of epoxidized organic groups $R^1$ bonded to the silicon atom is represented by a. In the compound represented by the formula (A), the number represented by a is 1 or 2, but in the present invention, an epoxidized organooxysilane compound wherein a is 1, is preferably employed.

In the above formula (A), $R^2$ is a $C_{1-10}$ alkyl group or an aryl group, and specifically, it may, for example, be a methyl group, an ethyl group, a propyl group, a hexyl group, a decyl group or a phenyl group. Preferred $R^2$ is an alkyl group having at most 4 carbon atoms. In the above formula (A), the number of $R^2$ represented by b i.e. the number of $C_{1-10}$ alkyl groups or aryl groups bonded to the silicon atom, is 0 or 1, but from the viewpoint of the abrasion resistance, b=0 is preferred.

In the above formula (A), $R^3$ is a hydrogen atom or a $C_{1-10}$ monovalent hydrocarbon group which may contain an oxygen atom. Such a monovalent hydrocarbon group may, for example, be a $C_{1-10}$ alkyl group, a $C_{2-10}$ alkenyl group or alkynyl group, a $C_5$ or $C_6$ cycloalkyl group, a $C_{2-10}$ acyl group, a $C_{6-10}$ aryl group or a $C_{7-10}$ aralkyl group, and specifically, it may, for example, be a methyl group, an ethyl group, a propyl group, an isopropyl group, a butyl group, a hexyl group, a phenyl group, an isopropenyl group, a methoxyethyl group or an acetyl group. The monovalent hydrocarbon group containing an oxygen atom may, for example, be a $C_{2-10}$ alkoxyalkyl group, an acyloxyalkyl group, or an alkoxycarbonylalkyl group, and specifically, it may, for example, be a 2-methoxyethyl group. Among them, in the present invention, an alkyl group having at most 4 carbon atoms such as a methyl group, an ethyl group or an isopropyl group, is particularly preferred from the viewpoint of the hydrolytic rate or the stability of the coating solution.

Further, in the above formula (A), a+b is 1 or 2, whereby the number of $OR^3$ bonded to the silicon atom, as represented by 4-a-b, is 3 or 2.

Such an epoxidized organooxysilane compound represented by the above formula (A) may specifically, be for example, 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, 2-(3,4-epoxycyclohexyl)ethylmethyldimethoxysilane, 2-(3,4-epoxycyclohexyl)ethyltriethoxysilane or 2-(3,4-epoxycyclohexyl)ethylmethyldiethoxysilane.

In the present invention, from the viewpoint of the solubility in other components contained in the coating solution for forming an ultraviolet-absorbing film of the present invention, the reactivity with the after-described organooxysilane compound (c), etc., the above organooxysilane compound (a) is more preferably e.g. 3-glycidoxypropyltrimethoxysilane, 2-(3,4-epoxycyclohexyl)ethyltrimethoxysilane, 3-glycidoxypropylmethyldimethoxysilane or 2-(3,4-epoxycyclohexyl)ethylmethyldimethoxysilane.

The organooxysilane compound (a) to be used in the present invention is considered to serve as a binder to impart cracking resistance while maintaining the desired abrasion resistance when the film is made thick.

<Organooxysilane Compound (b)>

The organooxysilane compound (b) in the present invention, i.e. an organooxysilane compound (b) which is a reaction production of a hydroxylated benzophenone compound and an epoxidized organooxysilane compound, is a component having an ultraviolet-absorbing ability by the action of the hydroxylated benzophenone compound as a starting material. The reaction product of the hydroxylated benzophenone compound and the epoxidized organooxysilane compound (referred to also as a silylated benzophenone compound, as mentioned above) is assembled in a silicon oxide type network having a crosslinked structure formed from an organooxysilane compound, whereby the residue of the hydroxylated benzophenone compound is fixed in the network. Thus, the hydroxylated benzophenone compound is prevented from bleeding out, whereby it is made possible that the ultraviolet-absorbing film maintains the ultraviolet-absorbing ability over a long period of time. Here, the silylated benzophenone compound has the same organooxysilyl group as the organooxysilane compound (a) and thus is regarded as one type of the organooxysilane compound.

The hydroxylated benzophenone compound as a starting material for the above silylated benzophenone compound may be any compound so long as it is a compound having a benzophenone skeleton and having a hydroxy group, but in the present invention, a benzophenone compound having from 2 to 4 hydroxy groups, represented by the following formula (B), is preferably used from such a viewpoint that it has an excellent ultraviolet-absorbing ability even after being silylated. From the viewpoint of the ultraviolet-absorbing ability, particularly from the viewpoint of the ability for absorbing ultraviolet rays with a wavelength of up to 380 nm, the number of hydroxyl groups in the hydroxylated benzophenone compound is more preferably 3 or 4.

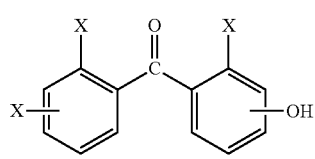

(B)

In the formula, each of Xs which may be the same or different from one another, is a hydrogen atom or a hydroxy group, provided that at least one of them is a hydroxy group.

Further, among the hydroxylated benzophenone compounds represented by the above formula (B), in the present invention, a 2,4-dihydroxybenzophenone represented by the following formula (2-1), a 2,2',3 (or 4,5,6)-trihydroxybenzophenone represented by the formula (2-2), a 2,2',4,4'-tetrahydroxybenzophenone represented by the formula (2-3), etc. are more preferred, and the 2,2',4,4'-tetrahydroxybenzophenone is particularly preferred. In the reaction of silylating the hydroxylated benzophenone compound, one of such hydroxylated benzophenone compounds may be used alone or two or more of them may be used in the form of a mixture.

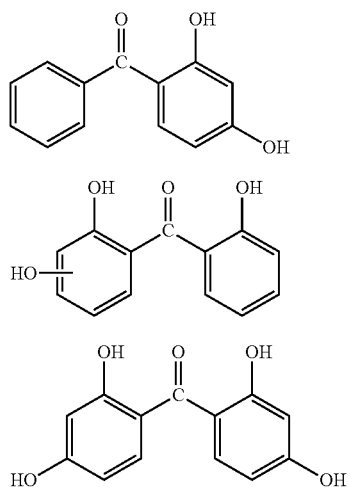

The epoxidized organooxysilane compound to be used for the reaction for silylating such a hydroxylated benzophenone compound may be the same compound as the above mentioned organooxysilane compound (a). Preferred may be the compound represented by the above formula (A), but more preferred may, for example, be 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, 2-(3,4-epoxycyclohexyl)ethylmethyldimethoxysilane, 2-(3,4-epoxycyclohexyl)ethyltriethoxysilane or 2-(3,4-epoxycyclohexyl)ethylmethyldiethoxysilane.

Among them, particularly preferred as the epoxidized organooxysilane compound from the viewpoint of e.g. the solubility in the coating solution may, for example, be 3-glycidoxypropyltrimethoxysilane, 2-(3,4-epoxycyclohexyl)ethyltrimethoxysilane, 3-glycidoxypropylmethyldimethoxysilane or 2-(3,4-epoxycyclohexyl)ethylmethyldimethoxysilane. In the reaction for silylating the hydroxylated benzophenone compound, one of such epoxidized organooxysilane compounds may be used alone, or two or more of them may be used in the form of a mixture.

As the method for obtaining the reaction product of the hydroxylated benzophenone compound and the epoxidized organooxysilane compound, a usual method for a silylation reaction may be used without any particular restriction, and specifically, the following method may be mentioned.

At least one of the hydroxylated benzophenone compounds and at least one of the epoxidized organooxysilane compounds are reacted, if necessary, in the presence of a catalyst. The amount of the epoxidized organooxysilane compound to be used for the reaction is not particularly limited, but it is preferably from 0.5 to 5.0 mol, more preferably from 1.0 to 3.0 mol, per 1 mol of the hydroxylated benzophenone compound. If the amount of the epoxidized organooxysilane compound is less than 0.5 mol per 1 mol of the hydroxylated benzophenone compound, in a case where the reaction product is to be added to the coating solution for forming an ultraviolet-absorbing film of the present invention, the solubility is likely to be low, and the hydroxylated benzophenone compound not silylated will be present substantially in the film and will be likely to bleed out. On the other hand, if the amount of the epoxidized organooxysilane compound exceeds 5.0 mol per 1 mol of the hydroxylated benzophenone compound, the absolute amount of the hydroxylated benzophenone compound relating to the ultraviolet-absorption becomes small, whereby the ultraviolet-absorbing ability tends to be low.

Further, in a case where in this reaction, the epoxidized organooxysilane compound is excessively added, a non-reacted epoxidized organooxysilane compound will remain without being reacted with the hydroxylated benzophenone compound, and such a non-reacted epoxidized organooxysilane compound will function as the above-mentioned organooxysilane compound (a), and therefore it is not necessary to remove the non-reacted epoxidized organooxysilane compound by purification. Here, such a non-reacted epoxidized organooxysilane compound is added as a blend amount of the organooxysilane compound (a), when it is blended to the after-described coating solution for forming an ultraviolet-absorbing film of the present invention.

The catalyst to be used for the silylation reaction is preferably a quaternary ammonium salt as disclosed in JP-A-58-10591. The quaternary ammonium salt may, for example, be tetramethylammonium chloride, tetraethylammonium chloride, benzyltrimethylammonium chloride or benzyltriethylammonium chloride.

The amount of the catalyst to be added to the reaction system is not particularly limited, but it is preferably from 0.005 to 10 parts by mass, more preferably from 0.01 to 5 parts by mass, per 100 parts by mass of the total of the hydroxylated benzophenone compound and the epoxidized organooxysilane compound. If the amount of the catalyst to be added is less than 0.005 part by mass per 100 parts by mass of the total of the hydroxylated benzophenone compound and the epoxidized organooxysilane compound, it tends to take long time for the reaction, and if it exceeds 10 parts by mass, when such a reaction product is added to the coating solution for forming an ultraviolet-absorbing film of the present invention, the catalyst is likely to lower the stability of the coating solution.

The above silylation reaction may be carried out by heating the mixture of the hydroxylated benzophenone compound and the epoxidized organooxysilane compound preferably in the above mentioned proportions in the presence of the catalyst within a temperature range of from 50 to 150° C. for from 4 to 20 hours. This reaction may be carried out in the absence of a solvent capable of dissolving both the hydroxylated benzophenone compound and the epoxidized organooxysilane compound. A method of employing the solvent is preferred from the viewpoint of handling efficiency or control efficiency of the reaction. Such a solvent may, for example, be toluene, xylene, ethyl acetate or butyl acetate. Further, the amount of the solvent to be used may, for example, be at a level of from 10 to 300 parts by mass per 100 parts by mass of the total of the hydroxylated benzophenone compound and the epoxidized organooxysilane compound.

The silylated benzophenone compound to be preferably used in the present invention, i.e. the organooxysilane compound (b), may, for example, be a reaction product obtained by reacting one or two hydroxy groups of a benzophenone compound containing at least three hydroxy groups with an epoxy group of an epoxidized organooxysilane compound, more preferably 4-(2-hydroxy-3-(3-trimethoxysilyl)propoxy)propoxy)-2,2',4'-trihydroxybenzophenone represented by the following formula (3-1). Here, in the following formula (3-1), Me represents a methyl group.

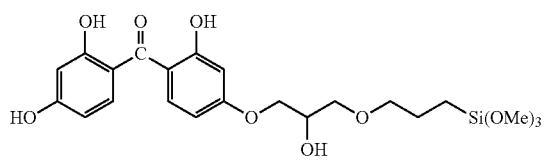

(3-1)

<Organooxysilane Compound (c)>

The organooxysilane compound (c) in the present invention is an organooxysilane compound other than the above (a) and (b), i.e. an organooxysilane compound not containing an epoxy group or a residual group of a hydroxylated benzophenone compound. The organooxysilane compound (c) is not particularly limited so long as it is an organooxysilane compound not containing an epoxy group or a residual group of a hydroxylated benzophenone compound, but in the present invention, a silane compound represented by the following formula (C) may preferably be mentioned.

(C)

In the above formula (C), $R^4$ is a $C_{1-10}$ substituted or unsubstituted monovalent hydrocarbon group, $R^5$ is a $C_{1-10}$ alkyl group or an aryl group, $R^6$ is a hydrogen atom or a $C_{1-10}$ monovalent hydrocarbon group which may contain an oxygen atom, and each of m and n is 0, 1 or 2, provided that m+n is 0, 1 or 2. However, the above $R^4$ is not an organic group containing an epoxy group or is not an organic group having a residue of a hydroxylated benzophenone compound.

In the above formula (C), $R^4$ may specifically be a $C_{1-10}$ alkyl group, an aryl group, a halogenated alkyl group, a halogenated aryl group, an alkenyl group or a substituted monovalent hydrocarbon group having some or all of hydrogen atoms of such a group substituted by a substituent containing no epoxy group, such as a (meth)acryloxy group, a mercapto group, an amino group or a cyano group. More specifically, it may, for example, be an alkyl group such as a methyl group, an ethyl group, a propyl group, an isopropyl group, a butyl group, a hexyl group, a decyl group or a cyclohexyl group, an aryl group such as a phenyl group or a phenethyl group, a halogenated alkyl group such as a 3-chloropropyl group, a 3,3,3-trifluoropropyl group or a 3,3,4,4,5,5,6,6,6-nonafluorohexyl group, a halogenated aryl group such as a p-chlorophenyl group, an alkenyl group such as a vinyl group, an allyl group, a 9-decenyl group or a p-vinylbenzyl group, a (meth)acryloxy group-containing organic group such as a 3-methacryloxypropyl group or a 3-acryloxypropyl group, a mercapto group-containing organic group such as a 3-mercaptopropyl group or a p-mercaptomethylphenylethyl group, an amino group-containing organic group such as a 3-aminopropyl group or a (2-aminoethyl)-3-aminopropyl group, or a cyano group-containing organic group such as a 2-cyanoethyl group. Here, the term "(meth)acryl . . . " of e.g. a (meth)acryloxy group, means both "acryl . . . " and "methacryl . . . ".

Further, in the present invention, $R^4$ may preferably be e.g. a 3-methacryloxypropyl group or a 3-acryloxypropyl group. In the above formula (C), the number of $R^4$ bonded to a silicon atom, represented by m, is 0, 1 or 2, but in the present invention, m=0 is preferred from the viewpoint of the abrasion resistance.

In the above formula (C), $R^5$ is the same group as $R^2$ in the above formula (A), and $R^6$ is the same group as $R^3$ in the above formula (A). $R^5$ is preferably an alkyl group having at most 4 carbon atoms, and $R^6$ is preferably an alkyl group having at most 4 carbon atoms. In the above formula (C), the number of $R^5$ bonded to the silicon atom, represented by n, is 0, 1 or 2. Further, m+n is 0, 1 or 2. Therefore, the number of $OR^6$ bonded to the silicon atom in the above formula (C), represented by 4-m-n, is 4, 3 or 2. That is, the silane compound represented by the above formula (C) to be used in the present invention, functions as a binder having an adhesive property.

The silane compound represented by the above formula (C) may specifically be a dialkoxysilane or diacyloxysilane, a trialkoxy or triacyloxysilane, or a tetraalkoxysilane, as exemplified below.

The dialkoxysilane or diacyloxysilane may specifically be e.g. dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, 3-chloropropylmethyldimethoxysilane, 3-chloropropylmethyldiethoxysilane, 3-chloropropylmethyldipropoxysilane, 3,3,3-trifluoropropylmethyldimethoxysilane, 3-methacryloxypropylmethyldimethoxysilane, 3-acryloxypropylmethyldimethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, N-(2-aminoethyl)-3-aminopropylmethyldimethoxysilane or 2-cyanoethylmethyldimethoxysilane.

The trialkoxy or triacyloxysilane may specifically be e.g. methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, 3-chloropropyltrimethoxysilane, 3-chloropropyltriethoxysilane, 3-chloropropyltripropoxysilane, 3,3,3-trifluoropropyltrimethoxysilane, 3-methacryloxypropyltrimethoxysilane, 3-acryloxypropyltrimethoxysilane, 3-aminopropyltrimethoxysilane, 3-aminopropyltriethoxysilane, 3-mercaptopropyltrimethoxysilane, 3-mercaptopropyltriethoxysilane, N-(2-aminoethyl)-3-aminopropyltrimethoxysilane or 2-cyanoethyltrimethoxysilane.

Further, the tetraalkoxysilane may specifically be e.g. tetramethoxysilane, tetraethoxysilane, tetra-n-propoxysilane, tetra-n-butyloxysilane, tetra-sec-butyloxysilane or tetra-tert-butyloxysilane.

Among them, as the organooxysilane compound (c), a tetraalkoxysilane having a $C_{1-4}$ alkoxy group, or a trialkoxysilane having a $C_{1-4}$ alkoxy group and a $C_{1-4}$ alkyl group, is preferred. Further preferred is a tetraalkoxysilane such as tetramethoxysilane or tetraethoxysilane.

In the organooxysilane compound, the organooxy group is hydrolyzed to form a hydroxy group bonded to a silicon atom (a silanol group), and then, such silanol groups undergo dehydration condensation to form a siloxane bond represented by —Si—O—Si— thereby to form a high molecular weight condensate. From a diorganooxysilane compound only, a linear polysiloxane will be formed, but from a triorganooxysilane compound or from a tetraorganooxysilane compound, a three dimensional network (a silicon oxide type network) of a polysiloxane will be formed. Also from a mixture of a diorganooxysilane compound with a triorganooxysilane compound or a tetraorganooxysilane compound, a three dimensional network of a polysiloxane will be formed.

The coating solution for forming an ultraviolet-absorbing film of the present invention is one to form an ultraviolet-absorbing film having mechanical durability such as abrasion resistance, and therefore, at least part of the organooxysilane compounds (a) to (c) is required to be a triorganooxysilane compound or a tetraorganooxysilane compound. Among three types of organooxysilane compounds (a) to (c) in the present invention, at least the organooxysilane compound (c) is preferably a trialkoxysilane or a tetraalkoxysilane, and the organooxysilane compounds (a) and (b) may be either a dialkoxysilane or a trialkoxysilane. In order to further increase the mechanical durability such as abrasion resistance, the organooxysilane compound (c) is more preferably a tetraalkoxysilane. Further, both the organooxysilane compounds (a) and (b) are preferably trialkoxysilanes.

<Partially Hydrolyzed (Co)Condensate of Organooxysilane Compound(s)>

The coating solution for forming an ultraviolet-absorbing film of the present invention may comprise the respective partially hydrolyzed condensates of the organooxysilane compounds (a) to (c) as the components derived respectively from the organooxysilane compounds (a) to (c). Otherwise, the coating solution for forming an ultraviolet-absorbing film of the present invention may comprise a partially hydrolyzed co-condensate of optional two types among the organooxysilane compounds (a) to (c) and the remaining one type, or may comprise a partially hydrolyzed co-condensate of three types of the organooxysilane compounds (a) to (c).

The partially hydrolyzed condensate is an oligomer formed by hydrolysis of the organooxysilane compounds, followed by dehydration condensation. The partially hydrolyzed condensate is usually a high molecular weight product of such a level that it dissolves in a solvent. The partially hydrolyzed condensate has organooxy groups and has such a nature that it further undergoes hydrolytic condensation to form a final cured product. Only from one type of organooxysilane compound, the partially hydrolyzed condensate may be obtained, or from two or more types of organooxysilane compounds, a partially hydrolyzed co-condensate may be obtained as their co-condensate. For example, from a mixture of two or more epoxidized organooxysilane compounds, as the organooxysilane compound (a), a partially hydrolyzed co-condensate may be obtained. However, in the present invention, one obtainable from different types of organooxysilane compounds among the organooxysilane compounds (a) to (c) is referred to as a partially hydrolyzed co-condensate, and one obtainable from two or more types belonging to any one of the ogranooxysilane compounds (a) to (c) will be referred to as a partially hydrolyzed condensate.

The partially hydrolyzed condensate may, for example, be a partially hydrolyzed condensate obtained from only the organooxysilane compound (a). Also from the ogranooxysilane compound (b) or the ogranooxysilane compound (c), its partially hydrolyzed condensate can be obtained. The partially hydrolyzed co-condensate may, for example, be a partially hydrolyzed co-condensate obtainable from a mixture of an organooxysilane compound (a) and an organooxysilane compound (b). Likewise, from a mixture of an organooxysilane compound (a) and an organooxysilane compound (c), or from a mixture of an organooxysilane compound (b) and an organooxysilane compound (c), their partially hydrolyzed co-condensate can be obtained. Further, from a mixture of three of an organooxysilane compound (a), an organooxysilane compound (b) and an organooxysilane compound (c), their partially hydrolyzed co-condensate can also be obtained. Such a partially hydrolyzed condensate or partially hydrolyzed co-condensate may contain an organooxysilane compound as a non-reacted starting material. Hereinafter, partially hydrolytic condensation and partially hydrolytic co-condensation may generally be referred to as partially hydrolytic (co)condensation, and one thereby obtainable may be referred to as a partially hydrolyzed (co)condensate.

The partially hydrolytic (co)condensation of the above organooxysilane compound(s) may, for example, be carried out by adding water to the organooxysilane compound(s) as starting material(s) or an alcohol solution thereof in the presence of an acid catalyst. The lower alcohol may, for example, be methanol, ethanol, isopropanol or butanol. Further, as a solvent which may be used in combination with such an alcohol, a ketone such as acetone or acetyl acetone, an ester such as ethyl acetate or isobutyl acetate, or an ether such as propylene glycol monomethyl ether, dipropylene glycol monomethyl ether or diisopropyl ether, may, for example, be mentioned. The amount of the lower alcohol to be used for the partially hydrolytic (co)condensation of the organooxysilane compound(s) may specifically be an amount at a level of from 0 to 1,000 parts by mass per 100 parts by mass of the organooxysilane compound(s). Further, the amount of water may specifically be an amount of preferably from 4 to 20 equivalents, more preferably from 8 to 15 equivalents, by molar ratio to the amount calculated as $SiO_2$, of the component derived from the organooxysilane compound (c). If the amount of water is less than 4 equivalents by the above molar ratio, the hydrolysis may not proceed, and the haze may increase, or depending upon the substrate at the time of coating, the coating solution may be repelled, and if it exceeds 20 equivalents, the hydrolytic rate is likely to be high, and the storage stability for a long period of time tends to be inadequate.

Further, the above acid catalyst may specifically be e.g. an inorganic acid such as nitric acid, hydrochloric acid, sulfuric acid, phosphoric acid, phosphorous acid, perchloric acid or sulfamic acid, a carboxylic acid such as formic acid, acetic acid, propionic acid, butyric acid, glycolic acid, oxalic acid, malonic acid, succinic acid, maleic acid, phthalic acid, citric acid or malic acid, or a sulfonic acid such as methanesulfonic acid or p-toluenesulfonic acid.

As the acid catalyst to be used for the partially hydrolytic (co)condensation in the present invention, it is preferred to use an acid with a primary proton having a pKa (hereinafter referred to as pKa1) of from 1.0 to 5.0 with a view to letting the obtainable ultraviolet-absorbing film maintain sufficient light resistance, particularly with a view to preventing deterioration by light of the ultraviolet-absorbing ability. Such an acid may specifically be e.g. acetic acid (pKa1=4.76), lactic acid (pKa1=3.64), maleic acid (pKa1=1.84), malonic acid (pKa1=2.65) or oxalic acid (pKa1=1.04).

The amount of the acid to be added may be set without any particular limitation within a range wherein the function as the catalyst can be performed. Specifically, in a case where an acid having a pKa1 of less than 1 is to be used, it is preferably contained in a proportion of from 0.001 to 0.1 mol/kg as the molar concentration, based on the total mass of the coating solution, of the proton when the primary proton of the acid is completely dissociated, and more preferably, it is contained in a proportion of from 0.001 to 0.1 mol/kg. With a view to letting the obtainable ultraviolet-absorbing film maintain sufficient light resistance, particularly with a view to preventing deterioration by light of the ultraviolet-absorbing ability, in a case where an acid having a pKa1 of from 1.0 to 5.0 is to be used, it is preferably contained in an amount of from 0.005 to 5.0 mol/kg, more preferably in an amount of from 0.01 to 3.5 mol/kg, as the above-mentioned molar concentration.

Specifically, the partially hydrolytic (co)condensation of the ogranooxysilane compound(s) can be carried out by stirring a reaction solution having water added to a lower alcohol solution of the organooxysilane compound(s) in the presence of an acid catalyst at a temperature of from 10 to 40° C. for from 1 to 48 hours.

<Composition of Coating Solution for Forming Ultraviolet-Absorbing Film of the Present Invention>

The coating solution for forming an ultraviolet-absorbing film of the present invention comprises a component derived from an epoxidized organooxysilane compound (a), a component derived from an organooxysilane compound (b) (hereinafter referred to as "a silylated benzophenone compound", as the case requires) which is a reaction product of a hydroxylated benzophenone compound and an epoxidized organooxysilane compound, and a component derived from an organooxysilane compound (c) other than the above (a) and (b).

The coating solution for forming an ultraviolet-absorbing film of the present invention may contain, as the respective components derived from the organooxysilane compounds (a) to (c), the organooxysilane compounds (a) to (c) themselves, or the respective partially hydrolyzed condensates of the organooxysilane compounds (a) to (c). Further, the coating solution for forming an ultraviolet-absorbing film of the present invention may contain a partially hydrolyzed co-condensate of optional two types among the organooxysilane compounds (a) to (c) and the remaining one type. Further, the coating solution for forming an ultraviolet-absorbing film of the present invention may contain a partially hydrolyzed co-condensate of three types of the organooxysilane compounds (a) to (c).

Thus, the combination of the respective components derived from the organooxysilane compounds (a) to (c) may, for example, be a combination of a partially hydrolyzed co-condensate of the organooxysilane compounds (a) and (c), and the organooxysilane compound (b), or a combination of a partially hydrolyzed co-condensate of the organooxysilane compounds (a) and (c), and the organooxysilane compound (b). Further, the coating solution for forming an ultraviolet-absorbing film of the present invention may contain a partially hydrolyzed co-condensate of three types of the organooxysilane compounds (a) to (c). Further, the coating solution containing the above partially hydrolyzed (co)condensate may contain the organooxysilane compounds (a) to (c) as non-reacted starting materials.

In the coating solution for forming an ultraviolet-absorbing film of the present invention, the compositional proportion of each component derived from the corresponding organooxysilane compound (a), (b) or (c) in the coating solution represents, in a case where the coating solution contains a partially hydrolyzed (co)condensate, a calculated amount obtained by calculating each constituting unit in the partially hydrolyzed (co)condensate to be the corresponding starting material organooxysilane compound (a), (b) or (c), or in a case where the coating solution further contains the organooxysilane compound (a), (b) or (c) in addition to such a partially hydrolyzed (co)condensate, the total amount obtained by adding such a calculated amount and the amount of each corresponding organooxysilane compound (a), (b) or (c) itself. For example, in a case where the coating solution for forming an ultraviolet-absorbing film contains only a partially hydrolyzed co-condensate of three types of the organooxysilane compounds (a) to (c), the amount of each constituting unit is calculated to be the corresponding organooxysilane compound (a), (b) or (c) and represented by the amount of the corresponding organooxysilane compound (a), (b) or (c). Further, for example, in a case where the coating solution for forming an ultraviolet-absorbing film contains a partially hydrolyzed co-condensate of three types of the organooxysilane compounds (a) to (c), and the organooxysilane compound (c), the amount of the organooxysilane compound (c) in the coating solution is the total amount of the constituting unit derived from the organooxysilane compound (c) in the partially hydrolyzed co-condensate and the organooxysilane compound (c) contained as a simple substance other than the co-condensate.

In the coating solution for forming an ultraviolet-absorbing film of the present invention, the proportions of the components derived from the organooxysilane compounds (a) to (c) as defined above are such proportions that, based on 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b), preferably, the component derived from the organooxysilane compound (a) is from 5 to 50 parts by mass, the component derived from the organooxysilane compound (b) is from 10 to 50 parts by mass, and the component derived from the organooxysilane compound (c) is from 40 to 80 parts by mass, more preferably, the component derived from the organooxysilane compound (a) is from 7 to 35 parts by mass, the component derived from the organooxysilane compound (b) is from 15 to 40 parts by mass, and the component derived from the organooxysilane compound (c) is from 45 to 70 parts by mass, particularly preferably, the component derived from the organooxysilane compound (a) is from 10 to 30 parts by mass, the component derived from the organooxysilane compound (b) is from 20 to 30 parts by mass, and the component derived from the organooxysilane compound (c) is from 50 to 65 parts by mass.

If the proportion of the component derived from the organooxysilane compound (a) based on 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b), is more than 50 parts by mass, the desired abrasion resistance may not be obtained, and if it is less than 5 parts by mass, cracking is likely to occur when it is attempted to form a film thickness required to obtain the desired ultraviolet-absorbing ability. If the proportion of the component derived from the organooxysilane compound (b) based on 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b), is more than 50 parts by mass, the desired abrasion resistance may not be obtained, and if it is less than 10 parts by mass, the desired ultraviolet ray absorbing ability may not be obtained. If the proportion of the component derived from the organooxysilane compound (c) based on 100 parts by mass of the total solid content of the component derived from the organooxysilane compound (a), the compound derived from the organooxysilane compound (b) which is a reaction product of a hydroxylated benzophenone compound and an epoxidized organooxysilane compound, and the component derived from the organooxysilane compound (c) other than the above (a) and (b), is more than 80 parts by mass, cracking is likely to occur when it is attempted to form a film thickness required to obtain the desired ultraviolet-absorbing ability, and if it is less than 40 parts by mass, the desired abrasion resistance may not be obtained.

Further, in the coating solution for forming an ultraviolet-absorbing film of the present invention, [(a)/(b)] i.e. the content ratio of the component derived from the organooxysilane compound (a) to the component derived from the organooxysilane compound (b) is preferably from 10/90 to 80/20, more preferably from 20/80 to 70/30, by mass ratio. If this (a)/(b) is smaller than 10/90, the desired abrasion resistance may not be obtained, and if it is larger than 80/20, cracking is likely to occur when it is attempted to form a film thickness required to obtain the desired ultraviolet-absorbing ability.

Further, in the coating solution for forming an ultraviolet-absorbing film of the present invention, [(b)/(c)] i.e. the content ratio of the component derived from the organooxysilane compound (b) to the component derived from the organooxysilane compound (c) is preferably from 20/80 to 40/60, more preferably from 25/75 to 35/65, by mass ratio. If this (b)/(c) is smaller than 20/80, cracking is likely to form when it is attempted to form a film thickness required to obtain the desired ultraviolet-absorbing ability, and if it is larger than 40/60, the desired abrasion resistance may not be obtained.

Further, in the coating solution for forming an ultraviolet-absorbing film of the present invention, the content of the component derived from the organooxysilane compound (c) is preferably from 1 to 10 mass %, more preferably from 3 to 8 mass %, as the $SiO_2$ content when silicon atoms contained in this component are calculated as $SiO_2$. If such a total content of the component derived from the organooxysilane compound (c) is less than 1%, it is required to increase the application amount of the coating solution in order to obtain an ultraviolet-absorbing film having the desired film thickness, and consequently, the appearance is likely to deteriorate, and if it exceeds 10 mass %, the film thickness in a state where the coating solution is applied, tends to be thick, and cracking is likely to be formed in the obtainable ultraviolet-absorbing film.

Further, in addition to the above organooxysilane compounds, etc. as essential components, the coating solution for forming an ultraviolet-absorbing film of the present invention may contain various optional additives, as the case requires, within a range not to impair the effects of the present invention.

Optional additives which may be contained in the coating solution for forming an ultraviolet-absorbing film of the present invention may, for example, be additives to improve light resistance (hereinafter referred to as "light resistance-improving agents" as the case requires) by preventing cracking or deterioration of the ultraviolet-absorbing ability of the ultraviolet-absorbing film by irradiation with light over a long period of time.

Such light resistance-improving agents may specifically be polyepoxides, glycerin, etc., but in the present invention, polyepoxides are preferred.

Polyepoxides are a general term for compounds having a plurality of epoxy groups. That is, an average number of epoxy groups in polyepoxides is at least 2, but in the present invention, a polyepoxide is preferred wherein the average number of epoxy groups is from 2 to 10.

As such polyepoxides, preferred are polyglycidyl compounds such as a polyglycidyl ether compound, a polyglycidyl ester compound and a polyglycidyl amine compound. Further, polyepoxides may either aliphatic polyepoxides or aromatic polyepoxides, and preferred are aliphatic polyepoxides. They are compounds having at least two epoxy groups.

Among them, a polyglycidyl ether compound is preferred, and an aliphatic polyglycidyl ether compound is particularly preferred. The polyglycidyl ether compound is preferably a glycidyl ether of an at least bifunctional alcohol, particularly preferably a glycidyl ether of an at least trifunctional alcohol, since it is thereby possible to obtain a higher effect to improve the light resistance. Here, such an alcohol is preferably an aliphatic alcohol, an alicyclic alcohol or a sugar alcohol.

Specifically, ethylene glycol diglycidyl ether, polyethylene glycol diglycidyl ether, propylene glycol diglycidyl ether, polypropylene glycol diglycidyl ether, neopentyl glycol diglycidyl ether, glycerol polyglycidyl ether, diglycerol polyglycidyl ether, polyglycerol polyglycidyl ether, trimethylolpropane polyglycidyl ether, sorbitol polyglycidyl ether, pentaerythritol polyglycidyl ether, etc. may be mentioned. One of them may be used, or two or more of them may be used in combination.

Among them, preferred is a polyglycidyl ether of an aliphatic polyol having at least three hydroxy groups (one wherein an average number of glycidyl groups (epoxy groups) per one molecule exceeds 2) such as glycerol polyglycidyl ether, diglycerol polyglycidyl ether, polyglycerol polyglycidyl ether or sorbitol polyglycidyl ether, since a higher effect to improve light resistance can be obtained.

The amount of the light resistance-improving agent to be incorporated is not particularly limited so long as it is an amount whereby it is possible to prevent light deterioration of the mechanical strength and ultraviolet-absorbing ability of the ultraviolet-absorbing film without impairing the effects of the present invention. For example, in a case where one member selected from polyepoxides and glycerin is to be used, its content is preferably from 0.1 to 20 parts by mass, more preferably from 1.0 to 10 parts by mass, based on 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b) in the coating solution for an ultraviolet-absorbing film. If the amount of the light-resistance-improving agent is less than 0.1 part by mass, there may be a case where light deterioration of the ultraviolet-absorbing ability cannot be sufficiently prevented, and if it exceeds 20 parts by weight, the mechanical strength of the ultraviolet-absorbing film is likely to deteriorate.

The coating solution for forming an ultraviolet-absorbing film of the present invention may further contain a light stabilizer for the purpose of improving the light resistance. As such a light stabilizer, a hindered amine type light stabilizer (HALS) may, for example, be preferably mentioned. The amount of the light stabilizer to be incorporated is preferably from 0.01 to 0.015 part by mass, more preferably from 0.002 to 0.009 part by mass per 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b).

An optional additive which the coating solution for forming an ultraviolet-absorbing film of the present invention may contain, may further be fine silica particles to be incorporated to further improve the abrasion resistance of the ultraviolet-absorbing film. The fine silica particles are preferably incorporated in the form of colloidal silica, when they are incorporated to the coating solution for forming an ultraviolet-absorbing film. Here, the colloidal silica is one having fine silica particles dispersed in water or an organic solvent such as methanol, ethanol, isobutanol or propylene glycol monomethyl ether. At the time of preparing the coating solution for forming ultraviolet-absorbing film of the present invention, the colloidal silica may be suitably incorporated to obtain a coating solution for forming an ultraviolet-absorbing film containing fine silica particles. Further, in a case where a partially hydrolyzed (co)condensate of an organooxysilane compound is to be produced, the colloidal silica may be incorporated to the starting material organooxysilane compound, followed by partial hydrolytic (co)condensation to obtain a partially hydrolyzed (co)condensate containing fine silica particles, which may be used to prepare the coating solution for forming an ultraviolet-absorbing film of the present invention containing fine silica particles.

In a case where fine silica particles are to be incorporated as an optional component to the coating solution for an ultraviolet-absorbing film of the present invention, it is preferred to incorporate fine silica particles having an average particle size (BET method) of from 1 to 100 nm. If the average particle size exceeds 100 nm, the particles tend to diffusely reflect light, whereby the haze value of the obtainable ultraviolet-absorbing film tends to be large, such being undesirable from the viewpoint of the optical quality. Further, the average particle size is particularly preferably from 5 to 40 nm, whereby it is possible to maintain the transparency of the ultraviolet-absorbing film, while imparting abrasion resistance to the ultraviolet-absorbing film. Further, the colloidal silica may be used in the form of either a water-dispersion type or an organic solvent dispersion type, but it is preferred to use an organic solvent-dispersion type. In the case of using a water-dispersion type, it is preferred to use colloidal silica dispersed in an acidic aqueous solution. Further, to the colloidal silica, fine inorganic particles other than fine silica particles, such as alumina sol, titania sol or ceria sol, may be incorporated.

Further, in a case where fine silica particles are to be incorporated as an optional component to the coating solution for forming an ultraviolet-absorbing film of the present invention, their amount to be incorporated is preferably from 0.5 to 50 parts by mass, more preferably from 10 to 30 parts by mass, per 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b). The above range is the range of fine silica particles to be incorporated wherein it is possible to maintain the film-forming property of the ultraviolet-absorbing film, while securing sufficient abrasion resistance, and it is possible to prevent cracking or deterioration of the transparency of the ultraviolet-absorbing film by agglomeration of fine silica particles one another.

The coating solution for forming an ultraviolet-absorbing film of the present invention may further contain functional fine particles such as indium tin oxide fine particles or antimony tin oxide fine particles, or an organic dye for the purpose of imparting functionality.

Further, for the purpose of the coating property on a substrate and smoothness of the coating film thereby obtainable, a surface active agent may be incorporated as an additive.

The coating solution for forming an ultraviolet-absorbing film of the present invention may further contain additives such as a defoaming agent, a viscosity-controlling agent, etc. for the purpose of improving the coating property on a substrate, or contain additives such as an adhesion-imparting agent, etc. for the purpose of improving the adhesion to the substrate. The amount of each of such additives is preferably from 0.01 to 2 parts by mass, per 100 parts by mass of the total solid content of the component derived from organooxysilane compound (a), the compound derived from organooxysilane compound (b) which is a reaction product of a hydroxylated benzophenone compound and an epoxidized organooxysilane compound, and the component derived from the organooxysilane compound (c) other than the above (a) and (b). Further, the coating solution for forming an ultraviolet-absorbing film of the present invention may contain a dye, a pigment, a filler, etc. within a range not to impair the purpose of the present invention.

Further, an additive to impart flexibility to the ultraviolet-absorbing film may, for example, be mentioned as an optional additive which the coating solution for forming an ultraviolet-absorbing film of the present invention may contain.

The additive to impart flexibility may, for example, be various organic resins, such as a silicone resin, an acrylic resin, a polyvinyl butyral (PVB) resin, a polyester resin, a polyurethane resin, an epoxy resin, etc.

By the coating solution for forming an ultraviolet-absorbing film of the present invention, an ultraviolet-absorbing film is formed by curing, as described hereinafter, the curable components, such as the component derived from the organooxysilane compound (a), the component derived from the organooxysilane compound (b) and the component derived from the organooxysilane compound (c), contained in the coating solution. The coating solution for forming an ultraviolet-absorbing film of the present invention preferably contains an acid catalyst to accelerate the curing.

Specifically, the acid catalyst may, for example, be an inorganic acid such as nitric acid, hydrochloric acid, sulfuric acid, phosphoric acid, phosphorous acid, perchloric acid or sulfamic acid, a carboxylic acid such as formic acid, acetic acid, propionic acid, butyric acid, glycolic acid, oxalic acid, malonic acid, succinic acid, maleic acid, phthalic acid, citric acid or malic acid, or a sulfonic acid such as methanesulfonic acid or p-toluenesulfonic acid.

In the present invention, among them, it is preferred to employ an acid having a primary proton pKa of from 1.0 to 5.0 with a view to letting the obtainable ultraviolet-absorbing film maintain sufficient light-resistance, particularly with a view to preventing light deterioration of the ultraviolet-absorbing ability. Specifically, such an acid may, for example, be acetic acid (pKa1=4.76), lactic acid (pKa1=3.64), maleic acid (pKa1=1.84), malonic acid (pKa1=2.65) or oxalic acid (pKa1=1.04).

Further, in the coating solution for forming an ultraviolet-absorbing film of the present invention, with a view to improving light resistance, particularly preventing light deterioration of the ultraviolet-absorbing ability, it is preferred to use an acid having a primary proton pKa of from 1.0 to 5.0 together with the above-mentioned light resistance-improving agent such as a polyepoxide or glycerin.

The amount of the acid to be incorporated may be set without any particular limitation, within a range where the function as a catalyst can be performed, but specifically, in a case where an acid having a pKa1 of less than 1.0 is to be used, such an acid is incorporated preferably in a proportion of from 0.001 to 0.1 mol/kg, more preferably from 0.001 to 0.01 mol/kg, as the molar concentration, based on the total mass of the coating solution, of the proton when the primary proton of the acid is completely dissociated. If the concentration of the acid to be used is less than 0.001 mol/kg, no adequate function as the catalyst may be performed, and if it exceeds 0.1 mol/kg, the ultraviolet-absorbing film is likely to undergo yellowing.

Particularly, with a view to letting the obtainable ultraviolet-absorbing film maintain sufficient light resistance and preventing light deterioration of the ultraviolet-absorbing ability, it is preferred to employ an acid having a pKa1 of from 1.0 to 5.0. In such a case, the acid is incorporated in a proportion of preferably from 0.005 to 5.0 mol/kg, more preferably from 0.01 to 3.5 mol/kg, as the above mentioned molar concentration. If the concentration of the acid to be used is less than 0.005 mol/kg, the hydrolysis may not proceed, the haze tends to increase during the film formation or depending upon the substrate, the coating solution may be repelled, and if it exceeds 5.0 mol/kg, the hydrolysis rate tends to increase, whereby the storage stability for a long period of time is likely to be inadequate.

The coating solution for forming an ultraviolet-absorbing film of the present invention may contain a curing catalyst in addition to the above acid catalyst. Such a curing catalyst may, for example, be an alkali metal salt such as a lithium salt, sodium salt or potassium salt, of an aliphatic carboxylic acid such as formic acid, acetic acid, propionic acid, butyric acid, lactic acid, tartaric acid or succinic acid; a quaternary ammonium salt such as a benzyltrimethylammonium salt, a tetramethylammonium salt or a tetraethylammonium salt; a metal alkoxide or chelate of e.g. aluminum, titanium or cerium; ammonium perchlorate, ammonium chloride, ammonium sulfate, sodium acetate, an imidazole or its salt, ammonium trifluoromethylsulfonate, or bis(trifluoromethylsulfonyl)bromomethyl ammonium.

Further, in the present invention, in order to obtain the desired abrasion resistance, it is preferred to adjust the pH of the coating solution for forming an ultraviolet-absorbing film to be from 1.0 to 5.0, more preferably from 2.0 to 4.5. As a method for adjusting the pH, a method of adjusting the content of the acid catalyst or the content of the curing catalyst, within the above-mentioned preferred range, may be mentioned.

The coating solution for forming an ultraviolet-absorbing film of the present invention usually contains water to subject the organooxysilane compounds, etc. to hydrolysis/condensation polymerization, in addition to the prescribed amounts of the above mentioned organooxysilane compounds, etc. as the essential components and various additives, etc. as optional additives.

The amount of water to be contained in the coating solution for forming an ultraviolet-absorbing film of the present invention is not particularly limited so long as it is a sufficient amount to subject the organooxysilane compounds, etc. to hydrolysis/condensation polymerization, but it is preferably from 4 to 20 equivalents, more preferably from 8 to 15 equivalents, by molar ratio to the amount, calculated as $SiO_2$, of the component derived from the organooxysilane compound (c). If the amount of water is less than 4 equivalents by the above molar ratio, the hydrolysis tends not to proceed, the haze is likely to increase during the film forming, or depending upon the substrate, the coating solution is likely to be repelled at the time of coating, and if it exceeds 20 equivalents, the hydrolysis rate tends to increase, whereby the storage stability for a long period of time is likely to be inadequate.

An ultraviolet-absorbing film to be formed by using the coating solution for forming an ultraviolet-absorbing film of the present invention usually has sufficient hardness durable in usual use. However, in a case where an acid having a pKa1 of from 1.0 to 5.0 is used as an acid catalyst for the coating solution for forming an ultraviolet-absorbing film for the purpose of improving the light resistance of the obtainable ultraviolet-absorbing film, particularly for the purpose of preventing light deterioration of the ultraviolet-absorbing ability, deterioration of the hardness, e.g. deterioration of the scratching resistance, may sometimes be observed. In order to prevent such deterioration of the scratching resistance thereby to maintain the hardness of the ultraviolet-absorbing film at a constant level, in the coating solution for forming an ultraviolet-absorbing film of the present invention, it is preferred to incorporate fine silica particles and further increase the amount of water to be incorporated to subject the organooxysilane compounds, etc. to hydrolysis/condensation polymerization, particularly when an acid having a pKa1 of from 1.0 to 5.0 is employed. The fine silica particles to be used here may be the same fine silica particles as described above. A preferred embodiment may be the same.

With respect to the amounts of the fine silica particles and water, specifically, the fine silica particles are incorporated in an amount of preferably from 0.5 to 50 parts by mass, more preferably from 1.0 to 10 parts by mass, per 100 parts by mass of the total solid content of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b), and the water is incorporated in an amount of preferably from 8 to 20 equivalents, more preferably from 12.5 to 17.5 equivalents, by molar ratio to the amount, calculated as $SiO_2$, of the component derived from the organooxysilane compound (c).

Here, in a case where a water dispersion type colloidal silica is used as the fine silica particles, such water is also regarded as the water contained in the coating solution for forming an ultraviolet-absorbing film.

If either one of the amounts of fine silica particles and water, is smaller than the lower limit of the corresponding amount, the scratching resistance is likely to deteriorate. Further, if fine silica particles are incorporated beyond the above upper limit, the film forming property for the ultraviolet-absorbing film may be adversely influenced, and if water is incorporated beyond the above upper limit, the hydrolysis rate tends to increase, whereby the storage stability for a long period of time is likely to be inadequate.

The coating solution for forming an ultraviolet-absorbing film of the present invention is prepared usually in such a form that the prescribed amounts of the organooxysilane compounds, etc., as the essential components, and optional amounts of various additives, etc. as optional additives, are dissolved or dispersed in a solvent. It is necessary that all non-volatile components in the coating solution for forming an ultraviolet-absorbing film are stably dissolved or dispersed, and for such a purpose, the solvent contains at least 20 mass %, preferably at least 50 mass %, of an alcohol.

As the alcohol to be used for such a solvent, methanol, ethanol, 1-propanol, 2-propanol, 1-butanol, 2-butanol, 2-methyl-1-propanol, 1-methoxy-2-propanol, 2-ethoxyethanol, 4-methyl-2-pentanol, 2-butoxyethanol, etc. are preferred, and among them, an alcohol having a boiling point of from 80 to 160° C. is preferred from such a viewpoint that the solubility of the component derived from the organooxysilane compound (a), the component derived from the organooxysilane compound (b) which is a reaction product of a hydroxylated benzophenone compound and an epoxidized organooxysilane compound, and the component derived from the organooxysilane compound (c) other than the above (a) and (b) is good, and the coating property on a substrate is good. Specifically, ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol is preferred.

Further, in the coating solution forming an ultraviolet-absorbing film of the present invention, as a solvent other than those described above, a solvent other than an alcohol, which is miscible with water/alcohol, may be used in combination, and such a solvent may, for example, be a ketone such as acetone or acetylacetone; an ester such as ethyl acetate or isobutyl acetate; or an ether such as propylene glycol monomethyl ether, dipropylene glycol monomethyl ether or diisopropyl ether.

The amount of the solvent to be used in the coating solution for forming an ultraviolet-absorbing film of the present invention is preferably from 100 to 1,900 parts by mass, more preferably from 250 to 900 parts by mass per 100 parts by mass of all no-volatile components in the coating solution for forming an ultraviolet-absorbing film. Further, in a case where the coating solution for forming an ultraviolet-absorbing film of the present invention contains the ogranooxysilane compounds (a) to (c) themselves as the components derived respectively from the organooxysilane compounds (a) to (c), they may be subjected to treatment for partially hydrolytic (co)condensation to stabilize the coating solution for e.g. storage. Usually, this purpose can be accomplished by stirring for a predetermined time at room temperature in the presence of an acid catalyst after mixing the organooxysilane compounds (a) to (c).

[Ultraviolet-Absorbing Glass Article of the Present Invention]

The ultraviolet-absorbing glass article of the present invention comprises a glass substrate and an ultraviolet-absorbing film formed on at least part of the glass substrate surface by using the coating solution for forming an ultraviolet-absorbing film of the present invention.

The material for the glass substrate to be used for the ultraviolet-absorbing glass article of the present invention is not particularly limited and may, for example, be usual soda lime glass, borosilicate glass, alkali-free glass or quartz glass. Further, as the glass substrate for the ultraviolet-absorbing glass article of the present invention, it is possible to use a glass substrate which absorbs ultraviolet rays or infrared rays.

Further, the ultraviolet-absorbing glass article of the present invention is preferably applied to an application where abrasion resistance is particularly required. Specifically, it is useful for a window of an automobile, particularly for a window shield or for a sliding window.

The ultraviolet-absorbing glass article of the present invention has an ultraviolet-absorbing film formed as described later by using the coating solution for forming an ultraviolet-absorbing film of the present invention having the above-described construction and makes it possible that the transmittance of light having a wavelength of 380 nm as measured by using a spectrophotometer (U-3500, manufactured by Hitachi, Ltd.) is at most 7.0%, preferably at most 4.0%, more preferably at most 1.0%, by the ultraviolet-absorbing ability of the hydroxylated benzophenone compound residue, which the component derived from the organooxysilane compound (b) has.

Further, a hydroxylated benzophenone compound residue as an ultraviolet-absorbing component is fixed to a silicon oxide network constituting the ultraviolet-absorbing film and is less susceptible to bleeding out in use for a long period of time, and thus, it makes the ultraviolet-absorbing glass article of the present invention to be excellent in long-term storage stability of the ultraviolet-absorbing ability. Further, in the ultraviolet-absorbing glass article of the present invention, the component derived from the organooxysilane compound (a) and the component derived from the organooxysilane compound (c) function as a binder component to form the silicon oxide type network having the component derived from the organooxysilane compound (b) fixed thereto, whereby it becomes possible to satisfy the adhesion of the ultraviolet-absorbing film to the glass substrate, the hardness such as the scratching resistance and the cracking resistance at a high dimensional level.

Further, the ultraviolet-absorbing film formed by using the coating solution for forming an ultraviolet-absorbing film wherein a light resistance-improving agent such as the above mentioned polyepoxide or glycerin is incorporated, and/or the above-mentioned acid having a pKa1 of from 1.0 to 5.0 is used as an acid catalyst, preferably both of them are contained, is an ultraviolet-absorbing film having light resistance i.e. durability against irradiation with light over a long period of time, whereby light deterioration of the mechanical strength and the ultraviolet-absorbing ability of the ultraviolet-absorbing film is prevented.

The ultraviolet-absorbing glass article of the present invention has an ultraviolet-absorbing film containing, as the main constituting element, a silicon oxide type network formed from the coating solution for forming an ultraviolet-absorbing film of the present invention, whereby it becomes possible that when an abrasion test of 1,000 rotations with a CS-10F abrasive wheel is applied against the surface of the ultraviolet-absorbing film in accordance with JIS-R3212 (1998), the increase in the haze after the test as compared to before the test is made to be at most 5.0%.

A specific process for applying the coating solution for forming an ultraviolet-absorbing film of the present invention on the above-mentioned glass substrate, may, for example, be a process which comprises (A) a step of applying the coating solution on the glass substrate to form a coating film and (B) a step of removing the organic solvent from the coating film and curing the three components derived respectively from the organooxysilane compounds (a) to (c) (hereinafter referred to as "organooxysilane compounds") to form a cured product thereby to form an ultraviolet-absorbing film.

The coating solution is applied on the glass substrate to form a coating film of the coating solution. The coating film to be formed here is a coating film containing the above solvent. The method for applying the coating solution on the glass substrate is not particularly limited so long as it is a method capable of uniformly applying the coating solution. A known method may be used such as a flow coating method, a dip coating method, a spin coating method, a spray coating method, a flexoprinting method, a screen printing method, a gravure printing method, a roll coating method, a meniscus coating method or a die coating method. The thickness of the coating film of the coating solution is determined taking into consideration the thickness of the finally obtainable ultraviolet-absorbing film.

Then, the step (B) of removing the solvent from the coating film of the coating solution on the glass substrate and curing the organooxysilane compounds to form an ultraviolet-absorbing film, is carried out.

The above coating film of the coating solution contains the volatile organic solvent, etc., and therefore, after forming the coating film by the coating solution, firstly, such a volatile component is evaporated and removed. Such removal of the volatile component is carried out preferably by heating and/or drying under reduced pressure. With a view to improving the leveling property of the coating film, it is preferred to carry out temporarily drying at a temperature of from about room temperature to 120° C. after forming the coating film of the coating solution on the glass substrate. Usually, during this temporary drying, the volatile component is vaporized and removed, and therefore, the operation for removal of the volatile component is included in the temporary drying. The time for the temporary drying i.e. the time for the operation of removing the volatile component is preferably from about 3 seconds to 2 hours, although it depends also on the coating solution to be used for forming the coating film.

At that time, it is preferred that the volatile component is sufficiently removed, but it may not completely be removed. That is, the organic solvent, etc. may remain in the ultraviolet-absorbing film within a range not influence the performance of the ultraviolet-absorbing film. Further, in a case where heating is carried out to remove the above volatile component, heating to prepare a silicon oxide type compound which may subsequently be carried out as the case requires, and heating to remove the above volatile component i.e. temporary drying, may be continuously carried out.

After removing the volatile component from the coating film as described above, the organooxysilane compounds are cured. This reaction can be carried out at room temperature or under heating. In a case where a cured product (the silicon oxide type network) is formed under heating, the upper limit of the heating temperature is preferably 200° C., particularly preferably 190° C., since the cured product contains an organic component. The cured product can be formed even at room temperature, and therefore, the lower limit of the heating temperature is not particularly limited. However, in a case where acceleration of the reaction by heating is intended, the lower limit of the heating temperature is preferably 60° C., more preferably 80° C. Therefore, this heating temperature is preferably from 60 to 200° C., more preferably from 80 to 190° C. The heating time is preferably from a few minutes to a few hours, although it may depend also on the coating solution to be used for forming the coating film.

The thickness of the ultraviolet-absorbing film in the ultraviolet-absorbing glass article having the ultraviolet-absorbing film thus formed by using the coating solution for forming an ultraviolet-absorbing film of the present invention, is preferably from 1.0 to 8.0 μm, more preferably from 1.5 to 7.0 μm. If the thickness of the ultraviolet-absorbing film is less than 1.0 μm, the ultraviolet-absorbing effects are likely to be inadequate. Further, if the thickness of the ultraviolet-absorbing film exceeds 8.0 μm, cracking is likely to result when the desired abrasion resistance is attained.

EXAMPLES

Now, the present invention will be described in further detail with reference to Examples, but it should be understood that the present invention is by no means restricted to such Examples. The following Examples 1 to 18 are working examples of the present invention, and Examples 19 to 21 are comparative examples. Further, constituting compounds of reagents represented by tradenames in Examples are as follows.

<Resin>

SR-SEP: sorbitol type polyglycidyl ether, manufactured by SAKAMOTO YAKUHIN KOGYO CO., LTD.

<Others>

SOLMIX AP-a: a mixed solvent of ethano:isopropyl alcohol:methanol=85:10:5 (mass ratio), manufactured by Japan Alcohol Trading CO., LTD.

Methanol silica sol: colloidal silica having fine silica particles having an average primary particle size of from 10 to 20 nm dispersed in methanol at a solid content concentration of 30 mass %, manufactured by Nissan Chemical Industries, Ltd.

Preparation Example for Silylated Ultraviolet-Absorber 49.2 g of 2,2',4,4'-tetrahydroxybenzophenone (manufactured by BASF), 47.3 g of 3-glycidoxypropyltrimethoxysilane (manufactured by Shin-Etsu Chemical Co., Ltd.), 0.8 g of benzyltriethylammonium chloride (manufactured by Junsei Chemical Co., Ltd.) and 100 g of butyl acetate (manufactured by Junsei Chemical Co., Ltd.) were charged, heated to 60° C. with stirring and dissolved and then heated to 120° C. and reacted for 4 hours to obtain a silylated ultraviolet-absorber solution having a solid content concentration of 49 mass %.

Example 1

41.9 g of ethanol, 17.3 g of tetramethoxysilane, 5.8 g of 3-glycidoxypropyltrimethoxysilane, 15.0 g of the silylated ultraviolet absorber solution obtained in the above Preparation Example, 15.8 g of pure water and 4.2 g of 1% nitric acid aqueous solution were charged and stirred for one hour to obtain a coating solution 1 for forming an ultraviolet-absorbing film. Then, the coating solution 1 was applied by a spin coating method on a high heat-absorbing green glass having its surface cleaned (Tv: 75.2%, Tuv: 9.5%, transmittance of light with a wavelength of 380 nm: 38.5%, 10 cm in length, 10 cm in width, 3.5 cm in thickness, tradename: UVFL, manufactured by Asahi Glass Company, Limited) and dried in atmospheric air at 150° C. for 30 minutes, to obtain an ultraviolet-absorbing film-attached glass plate. The properties of the obtained ultraviolet-absorbing film-attached glass plate were evaluated as follows. The evaluation results are shown in Table 2.

[Evaluations]

1) Film thickness: Cross sectional observation of the ultraviolet-absorbing film was carried out by a scanning electron microscope (S-800, manufactured by Hitachi, Ltd.), and the film thickness [nm] was obtained from the obtained observation image.

2) Crack: The ultraviolet-absorbing film after drying was observed visually and by a metal microscope, and whether or not a crack was formed on the layer surface, was judged. One wherein no crack was formed i.e. no crack was observed visually or by the microscope, was evaluated to be ○, one wherein a crack was not observed visually but observed by the microscope was evaluated to be Δ, and one wherein a crack was observed even visually was evaluated to be X.

3) The spectral properties were judged by the transmittance of light at a wavelength of 380 nm as measured by means of a spectrophotometer (U-3500 manufactured by Hitachi Ltd.), and by the visible light transmittance and the ultraviolet transmittance calculated in accordance with JIS-R3106.

4) Abrasion resistance: Using Taber's abrasion resistance test machine, in accordance with the method disclosed in JIS-R3212 (1998), an abrasion test of 1,000 rotations with a CS-10F abrasive wheel was carried out, whereby the degrees of scar before and after the test were measured by haze values, and the abrasion resistance was evaluated by an increase [%] in the haze value.

5) Moisture resistance test: A sample was put in a constant temperature constant humidity tank at 80° C. with a relative humidity of 95%, and upon expiration of 1,000 hours, the transmittance of light at a wavelength of 380 nm through the sample was measured, and at the same time, judgment of a crack was carried out by the same method as in the above 2).

6) Accelerated weather resistance test (evaluation of light resistance): A sample was set in a Super Xenon Weather Meter (SX75 manufactured by Suga Test Instruments Co., Ltd.), and the sample was exposed under conditions of an illumination intensity of 150 W/m$^2$ (300 to 400 nm), a black panel temperature of 83° C. and a relative humidity of 50%, and upon expiration of 1,000 hours, the transmittance of light at a wavelength of 380 nm through the sample was measured, and at the same time, judgment of a crack was carried out in the same manner as in the above 2).

7) Scratch test (scratching resistance/hardness evaluation): On the ultraviolet ray-absorbing film on the glass plate, a ball point pen was pressed manually, and the surface was scratched for 2 cm, whereupon the scratch mark was visually judged for the scratch test. The film having a scratch mark visually observed was evaluated to be X, and one having no or substantially no scratch mark visually observed was evaluated to be ○.

Example 2

An ultraviolet ray-absorbing film-attached glass plate was prepared in the same manner as in Example 1 except that the film thickness was changed. The properties of the obtained ultraviolet-absorbing film-attached glass plate were evaluated in the same manner as in Example 1. The evaluation results are shown in Table 2.

Example 3

42.6 g of ethanol, 18.1 g of tetramethoxysilane, 4.6 g of 3-glycidoxypropyltrimethoxysilane, 14.8 g of the silylated ultraviolet absorber solution obtained in the above Preparation Example, 15.8 g of pure water and 4.2 g of a 1% nitric acid aqueous solution were charged and stirred for one hour to obtain a coating solution 2 for forming an ultraviolet-absorbing film. An ultraviolet-absorbing film-attached glass plate was prepared in the same manner as in Example 1 except that the above coating solution 2 was used instead of the coating solution 1. The properties of the obtained ultraviolet-absorbing film-attached glass plate were evaluated in the same manner as in Example 1. The evaluation results are shown in Table 2.

Example 4

41.9 g of ethanol, 15.4 g of tetramethoxysilane, 8.0 g of 3-glycidoxypropyltrimethoxysilane, 15.2 g of the silylated ultraviolet absorber solution obtained in the above Preparation Example, 15.4 g of pure water and 4.2 g of a 1% nitric acid aqueous solution were charged and stirred for one hour to obtain a coating solution 3 for forming an ultraviolet-absorbing film. An ultraviolet-absorbing film-attached glass plate was prepared in the same manner as in Example 1 except that the above coating solution 3 was used instead of the coating solution 1. The properties of the obtained ultraviolet-absorbing film-attached glass plate were evaluated in the same manner as in Example 1. The evaluation results are shown in Table 2.

Example 5

46.2 g of ethanol, 16.6 g of tetramethoxysilane, 2.8 g of 3-glycidoxypropyltrimethoxysilane, 17.0 g of the silylated ultraviolet absorber solution obtained in the above Preparation Example, 13.8 g of pure water and 3.6 g of a 1% nitric acid aqueous solution were charged and stirred for one hour to obtain a coating solution 4 for forming an ultraviolet-absorbing film. An ultraviolet-absorbing film-attached glass plate was prepared in the same manner as in Example 1 except that the above coating solution 4 was used instead of the coating solution 1. The properties of the obtained ultraviolet-absorbing film-attached glass plate were evaluated in the same manner as in Example 1. The evaluation results are shown in Table 2.

Example 6

38.8 g of ethanol, 16.4 g of tetramethoxysilane, 9.8 g of 3-glycidoxypropyltrimethoxysilane, 13.4 g of the silylated ultraviolet absorber solution obtained in the above Preparation Example, 17.1 g of pure water and 4.5 g of a 1% nitric acid aqueous solution were charged and stirred for one hour to obtain a coating solution 5 for forming an ultraviolet-absorbing film. An ultraviolet-absorbing film-attached glass plate was prepared in the same manner as in Example 1 except that the above coating solution 5 was used instead of the coating solution 1. The properties of the obtained ultraviolet-absorbing film-attached glass plate were evaluated in the same manner as in Example 1. The evaluation results are shown in Table 2.

Example 7

21.2 g of SOLMIX AP-1, 15.0 g of tetramethoxysilane, 5.1 g of 3-glycidoxypropyltrimethoxysilane, 14.6 g of the silylated ultraviolet absorber solution obtained in the above Preparation Example, 1.2 g of SR-SEP as polyepoxide, 2.1 g of methanol silica sol as colloidal silica, 14.2 g of acetic acid and 26.6 g of ion-exchanged water were charged and stirred for one hour. Then, 4.94 g of SOLMIX AP-1 was added and stirred to obtain a coating solution 6 for forming an ultraviolet-absorbing film. An ultraviolet-absorbing film-attached glass plate was prepared in the same manner as in Example 1 except that the above coating solution 6 was used instead of the coating solution 1 and the drying conditions were changed to 180° C. for 30 minutes. The properties of the obtained ultraviolet-absorbing film-attached glass plate were evaluated in the same manner as in Example 1 except that the temperature for the moisture resistance test was changed to 50° C. The evaluation results are shown in Table 2.

Example 8

An ultraviolet-absorbing film-attached glass plate was prepared in the same manner as in Example 7 except that the film thickness was changed. The properties of the obtained ultraviolet-absorbing film-attached glass plate was evaluated in the same manner as in example 7. The evaluation results are shown in Table 2.

Example 9

14.0 g of SOLMIX AP-1, 16.5 g of tetramethoxysilane, 5.2 g of 3-glycidoxypropyltrimethoxysilane, 15.0 g of the silylated ultraviolet absorber solution obtained in the above Preparation Example, 0.3 g of SR-SEP as polyepoxide, 4.2 g of methanol silica sol as colloidal silica, 15.6 g of acetic acid and 29.2 g of ion-exchanged water were charged and stirred for one hour. Then, 4.94 g of SOLMIX AP-1 was added and stirred to obtain a coating solution 7 for forming an ultraviolet-absorbing film. An ultraviolet-absorbing film-attached glass plate was prepared in the same manner as in Example 7 except that the above coating solution 7 was used instead of the coating solution 6. The properties of the obtained ultraviolet-absorbing film-attached glass plate were evaluated in the same manner as in Example 7. The evaluation results are shown in Table 2.

Example 10

20.5 g of SOLMIX AP-1, 14.5 g of tetramethoxysilane, 5.3 g of 3-glycidoxypropyltrimethoxysilane, 15.0 g of the silylated ultraviolet absorber solution obtained in the above Preparation Example, 1.1 g of SR-SEP as polyepoxide, 4.2 g of methanol silica sol as colloidal silica, 13.7 g of acetic acid and 25.7 g of ion-exchanged water were charged and stirred for one hour. Then, 4.94 g of SOLMIX AP-1 was added and stirred to obtain a coating solution 8 for forming an ultraviolet-absorbing film. An ultraviolet-absorbing film-attached glass plate was prepared in the same manner as in Example 7 except that the above coating solution 8 was used instead of the coating solution 6. The properties of the obtained ultraviolet-absorbing film-attached glass plate were evaluated in the same manner as in Example 7. The evaluation results are shown in Table 2.

Example 11

49.5 g of SOLMIX AP-1, 15.5 g of tetramethoxysilane, 4.9 g of 3-glycidoxypropyltrimethoxysilane, 14.1 g of the silylated ultraviolet absorber solution obtained in the above Preparation Example, 1.3 g of SR-SEP as polyepoxide, 3.1 g of a 1% nitric acid aqueous solution and 11.6 g of ion-exchanged water were charged and stirred for one hour. Then, 4.94 g of SOLMIX AP-1 was added and stirred to obtain a coating solution 9 for forming an ultraviolet-absorbing film. An ultraviolet-absorbing film-attached glass plate was prepared in the same manner as in Example 7 except that the above coating solution 9 was used instead of the coating solution 6. The properties of the obtained ultraviolet-absorbing film-attached glass plate were evaluated in the same manner as in Example 7. The evaluation results are shown in Table 2.

Example 12

34.9 g of SOLMIX AP-1, 15.5 g of tetramethoxysilane, 4.9 g of 3-glycidoxypropyltrimethoxysilane, 14.1 g of the silylated ultraviolet absorber solution obtained in the above Preparation Example, 1.3 g of SR-SEP as polyepoxide, 14.6 g of acetic acid and 14.6 g of ion-exchanged water were charged and stirred for one hour. Then, 4.94 g of SOLMIX AP-1 was added and stirred to obtain a coating solution 10 for forming an ultraviolet-absorbing film. An ultraviolet-absorbing film-attached glass plate was prepared in the same manner as in Example 7 except that the above coating solution 10 was used instead of the coating solution 6. The properties of the obtained ultraviolet-absorbing film-attached glass plate were evaluated in the same manner as in Example 7. The evaluation results are shown in Table 2.

Example 13

33.9 g of SOLMIX AP-1, 15.8 g of tetramethoxysilane, 5.0 g of 3-glycidoxypropyltrimethoxysilane, 14.4 g of the silylated ultraviolet absorber solution obtained in the above Preparation Example, 1.0 g of glycerin (manufactured by Junsei Chemical Co., Ltd.), 14.9 g of acetic acid and 14.9 g of ion-exchanged water were charged and stirred for one hour. Then, 4.94 g of SOLMIX AP-1 was added and stirred to obtain a coating solution 11 for forming an ultraviolet-absorbing film. An ultraviolet-absorbing film-attached glass plate was prepared in the same manner as in Example 7 except that the above coating solution 11 was used instead of the coating solution 6. The properties of the obtained ultraviolet-absorbing film-attached glass plate were evaluated in the same manner as in Example 7. The evaluation results are shown in Table 2.

Example 14

50.3 g of SOLMIX AP-1, 12.1 g of tetramethoxysilane, 3.8 g of 3-glycidoxypropyltrimethoxysilane, 11.0 g of the silylated ultraviolet absorber solution obtained in the above Preparation Example, 11.4 g of acetic acid and 11.4 g of ion-exchanged water were charged and stirred for one hour. Then, 4.94 g of SOLMIX AP-1 was added and stirred to obtain a coating solution 12 for forming an ultraviolet-absorbing film. An ultraviolet-absorbing film-attached glass plate was prepared in the same manner as in Example 7 except that the above coating solution 12 was used instead of the coating solution 6. The properties of the obtained ultraviolet-absorbing film-attached glass plate were evaluated in the same manner as in Example 1 except for the moisture resistance test. The evaluation results are shown in Table 2.

Example 15

52.2 g of SOLMIX AP-1, 12.1 g of tetramethoxysilane, 3.8 g of 3-glycidoxypropyltrimethoxysilane, 11.0 g of the silylated ultraviolet absorber solution obtained in the above Preparation Example, 9.5 g of lactic acid and 11.4 g of ion-exchanged water were charged and stirred for one hour. Then, 4.94 g of SOLMIX AP-1 was added and stirred to obtain a coating solution 13 for forming an ultraviolet-absorbing film. An ultraviolet-absorbing film-attached glass plate was prepared in the same manner as in Example 7 except that the above coating solution 13 was used instead of the coating solution 6. The properties of the obtained ultraviolet-absorbing film-attached glass plate were evaluated in the same manner as in Example 1 except for the moisture resistance test. The evaluation results are shown in Table 2.

Example 16

61.5 g of SOLMIX AP-1, 12.1 g of tetramethoxysilane, 3.8 g of 3-glycidoxypropyltrimethoxysilane, 11.0 g of the silylated ultraviolet absorber solution obtained in the above Preparation Example, 0.2 g of malonic acid and 11.4 g of ion-exchanged water were charged and stirred for one hour. Then, 4.94 g of SOLMIX AP-1 was added and stirred to obtain a coating solution 14 for forming an ultraviolet-absorbing film. An ultraviolet-absorbing film-attached glass plate was prepared in the same manner as in Example 7 except that the above coating solution 14 was used instead of the coating solution 6. The properties of the obtained ultraviolet-absorbing film-attached glass plate were evaluated in the same manner as in Example 1 except for the moisture resistance test. The evaluation results are shown in Table 2.

Example 17

17.8 g of SOLMIX AP-1, 16.5 g of tetramethoxysilane, 5.3 g of 3-glycidoxypropyltrimethoxysilane, 15.1 g of the silylated ultraviolet absorber solution obtained in the above Preparation Example, 0.3 g of SR-SEP as epoxide, 15.6 g of acetic acid and 29.3 g of ion-exchanged water were charged and stirred for one hour. Then, 4.94 g of SOLMIX AP-1 was added and stirred to obtain a coating solution 15 for forming an ultraviolet-absorbing film. An ultraviolet-absorbing film-attached glass plate was prepared in the same manner as in Example 7 except that the above coating solution 15 was used instead of the coating solution 6. The properties of the obtained ultraviolet-absorbing film-attached glass plate were evaluated in the same manner as in Example 7. The evaluation results are shown in Table 2.

Example 18

30.4 g of SOLMIX AP-1, 15.5 g of tetramethoxysilane, 4.9 g of 3-glycidoxypropyltrimethoxysilane, 14.2 g of the silylated ultraviolet absorber solution obtained in the above Preparation Example, 1.2 g of SR-SEP as polyepoxide, 4.3 g of methanol silica sol as colloidal silica, 14.7 g of acetic acid and 14.7 g of ion-exchanged water were charged and stirred for one hour. Then, 4.94 g of SOLMIX AP-1 was added and stirred to obtain a coating solution 16 for forming an ultraviolet-absorbing film. An ultraviolet-absorbing film-attached glass plate was prepared in the same manner as in Example 7 except that the above coating solution 16 was used instead of the coating solution 6. The properties of the obtained ultraviolet-absorbing film-attached glass plate were evaluated in the same manner as in Example 7. The evaluation results are shown in Table 2.

Example 19

43.3 g of ethanol, 21.8 g of tetramethoxysilane, 14.2 g of the silylated ultraviolet absorber solution obtained in the above Preparation Example, 16.4 g of pure water and 4.3 g of a 1% nitric acid aqueous solution were charged and stirred for one hour to obtain a coating solution 17 for forming an ultraviolet-absorbing film. An ultraviolet-absorbing film-attached glass plated was prepared in the same manner as in Example 1 except that the above coating solution 17 was used instead of the coating solution 1. The properties of the obtained ultraviolet-absorbing film-attached glass plate were evaluated in the same manner as in Example 1. The evaluation results are shown in Table 2.

Example 20

47.0 g of ethanol, 15.1 g of tetramethoxysilane, 5.1 g of methyltrimethoxysilane, 13.1 g of the silylated ultraviolet absorber solution obtained in the above Preparation Example, 15.6 g of pure water and 4.1 g of a 1% nitric acid aqueous solution were charged and stirred for one hour to obtain a coating solution 18 for forming an ultraviolet-absorbing film. An ultraviolet-absorbing film-attached glass plate was prepared in the same manner as in Example 1 except that the above coating solution 18 was used instead of the coating solution 1, and the thickness of the ultraviolet-absorbing film after drying was changed as shown in Table 2. The properties of the obtained ultraviolet-absorbing film-attached glass plate were evaluated in the same manner as in Example 1. The evaluation results are shown in Table 2.

Example 21

49.6 g of ethanol, 17.3 g of tetramethoxysilane, 9.6 g of 3-glycidoxypropyltrimethoxysilane, 3.6 g of 2,2',4,4'-tetrahydroxybenzophenone, 15.8 g pure water and 4.2 g of a 1% nitric acid aqueous solution were charged and stirred for one hour to obtain a coating solution 19 for forming an ultraviolet-absorbing film. An ultraviolet-absorbing film-attached glass plated was prepared in the same manner as in Example 1 except that the above coating solution 19 was used instead of the coating solution 1 and the thickness of the ultraviolet-absorbing film after drying was changed as shown in Table 2. The properties of the obtained ultraviolet-absorbing film-attached glass plate were evaluated in the same manner as in Example 1. The evaluation results are shown in Table 2.

The compositions of the coating solutions for forming ultraviolet-absorbing films obtained in the above Examples 1 to 21 are summarized in Table 1. Here, in Table 1, abbreviations of the compounds used represent the following compounds.

TMOS: Tetramethoxysilane
MTMS: Methyltrimethoxysilane
GPTMS: 3-Glycidoxypropyltrimethoxysilane
Si-THBP: Silylated ultraviolet absorber obtained in Preparation Example
THBP: 2,2',4,4'-Tetrahydroxybenzophenone

TABLE 1

Solid content composition in coating solution for forming ultraviolet-absorbing film (parts by mass)

| | Compound (c) | | Compound (a) | Compound (b) | Ultraviolet absorber | | Resin, etc. | | Fine silica particles |
|---|---|---|---|---|---|---|---|---|---|
| | TMOS | MTMS | GPTMS | Si-THBP | THBP | Type | Amount | | |
| Ex. 1 | 56.8 | — | 19.1 | 24.1 | — | — | — | | — |
| Ex. 2 | 56.8 | — | 19.1 | 24.1 | — | — | — | | — |
| Ex. 3 | 60.4 | — | 15.4 | 24.2 | — | — | — | | — |
| Ex. 4 | 49.9 | — | 25.9 | 24.2 | — | — | — | | — |
| Ex. 5 | 59.9 | — | 10.1 | 30.0 | — | — | — | | — |
| Ex. 6 | 50.1 | — | 29.9 | 20.0 | — | — | — | | — |
| Ex. 7 | 55.0 | — | 18.7 | 26.2 | — | SR-SEP | 4.4 | | 7.7 |
| Ex. 8 | 55.0 | — | 18.7 | 26.2 | — | SR-SEP | 4.4 | | 7.7 |
| Ex. 9 | 55.9 | — | 17.6 | 26.4 | — | SR-SEP | 1.0 | | 14.2 |
| Ex. 10 | 53.4 | — | 19.5 | 27.1 | — | SR-SEP | 4.1 | | 15.5 |
| Ex. 11 | 56.8 | — | 17.9 | 25.3 | — | SR-SEP | 4.8 | | — |
| Ex. 12 | 56.8 | — | 17.9 | 25.3 | — | SR-SEP | 4.8 | | — |
| Ex. 13 | 56.7 | — | 17.9 | 25.3 | — | Glycerin | 3.6 | | — |
| Ex. 14 | 56.8 | — | 17.8 | 25.3 | — | — | — | | — |
| Ex. 15 | 56.8 | — | 17.8 | 25.3 | — | — | — | | — |
| Ex. 16 | 56.8 | — | 17.8 | 25.3 | — | — | — | | — |
| Ex. 17 | 56.5 | — | 18.2 | 25.3 | — | SR-SEP | 1.0 | | — |
| Ex. 18 | 56.7 | — | 17.9 | 25.4 | — | SR-SEP | 4.4 | | 15.7 |
| Ex. 19 | 75.8 | — | — | 24.2 | — | — | — | | — |
| Ex. 20 | 56.7 | 19.2 | — | 24.1 | — | — | — | | — |
| Ex. 21 | 56.7 | — | 31.5 | — | 11.8 | — | — | | — |

Contents of the respective components in coating solution for forming ultraviolet-absorbing film

| | Acid catalyst | | Water | Compound (c) |
|---|---|---|---|---|
| | Type | Proton concentration in coating solution [mol/kg] | Molar equivalents to the amount, calculated as SiO₂, of compound (c) | Content calculated as SiO₂ in coating solution [mass %] |
| Ex. 1 | Nitric acid | 0.004 | 8.0 | 6.8 |
| Ex. 2 | Nitric acid | 0.004 | 8.0 | 6.8 |
| Ex. 3 | Nitric acid | 0.004 | 8.0 | 7.1 |
| Ex. 4 | Nitric acid | 0.004 | 8.0 | 6.1 |
| Ex. 5 | Nitric acid | 0.005 | 8.0 | 6.5 |
| Ex. 6 | Nitric acid | 0.005 | 8.0 | 6.5 |
| Ex. 7 | Acetic acid | 2.3 | 15.0 | 5.9 |
| Ex. 8 | Acetic acid | 2.3 | 15.0 | 5.9 |
| Ex. 9 | Acetic acid | 2.6 | 15.0 | 6.5 |
| Ex. 10 | Acetic acid | 2.3 | 15.0 | 5.7 |
| Ex. 11 | Nitric acid | 0.005 | 8.0 | 6.1 |
| Ex. 12 | Acetic acid | 2.4 | 8.0 | 6.1 |
| Ex. 13 | Acetic acid | 2.5 | 8.0 | 6.2 |
| Ex. 14 | Acetic acid | 1.9 | 8.0 | 4.8 |
| Ex. 15 | Lactic acid | 1.5 | 8.0 | 4.8 |
| Ex. 16 | Malonic acid | 0.05 | 8.0 | 4.8 |
| Ex. 17 | Acetic acid | 2.6 | 15.0 | 6.5 |
| Ex. 18 | Acetic acid | 2.3 | 8.0 | 6.1 |
| Ex. 19 | Nitric acid | 0.007 | 8.0 | 8.6 |
| Ex. 20 | Nitric acid | 0.005 | 8.0 | 5.9 |
| Ex. 21 | Nitric acid | 0.036 | 8.0 | 6.8 |

TABLE 2

| | Film thickness [nm] | Initial values Crack | Initial values Transmittance [%] at wavelength of 380 nm | Initial values Haze value [%] | Scratch test | Increase [%] in haze value after abrasion resistance test | After moisture resistance test Crack | After moisture resistance test Transmittance [%] at wavelength of 380 nm | After accelerated weather resistance test Crack | After accelerated weather resistance test Transmittance [%] at wavelength of 380 nm |
|---|---|---|---|---|---|---|---|---|---|---|
| Ex. 1 | 2,500 | ○ | 0.6 | 0.1 | ○ | 3.5 | ○ | 0.7 | ○ | 17.5 |
| Ex. 2 | 3,000 | ○ | 0.4 | 0.1 | ○ | 3.2 | ○ | 0.4 | ○ | 16.8 |
| Ex. 3 | 2,400 | ○ | 0.6 | 0.1 | ○ | 3.0 | ○ | 0 | X | — |
| Ex. 4 | 2,750 | ○ | 0.6 | 0.1 | ○ | 3.8 | ○ | 0.6 | ○ | 18.0 |
| Ex. 5 | 2,000 | ○ | 0.5 | 0.1 | ○ | 3.6 | ○ | 0.6 | ○ | 15.5 |
| Ex. 6 | 2,800 | ○ | 0.6 | 0.1 | ○ | 3.0 | ○ | 0.6 | ○ | 16.8 |
| Ex. 7 | 4,000 | ○ | 0.4 | 0.1 | ○ | 2.0 | ○ | 0.3 | ○ | 0.8 |
| Ex. 8 | 6,500 | ○ | 0.1 | 0.1 | ○ | 1.9 | ○ | 0.1 | ○ | 0.2 |
| Ex. 9 | 6,300 | ○ | 0.1 | 0.1 | ○ | 1.9 | ○ | 0.1 | ○ | 0.2 |
| Ex. 10 | 6,000 | ○ | 0.2 | 0.1 | ○ | 2.0 | ○ | 0.1 | ○ | 0.3 |
| Ex. 11 | 2,800 | ○ | 0.6 | 0.4 | ○ | 2.2 | ○ | 0.5 | ○ | 6.1 |
| Ex. 12 | 3,200 | ○ | 0.6 | 0.3 | X | 2.1 | ○ | 0.5 | ○ | 0.9 |
| Ex. 13 | 3,100 | ○ | 0.6 | 0.2 | X | 2.9 | ○ | 0.7 | ○ | 1.6 |
| Ex. 14 | 2,600 | ○ | 0.7 | 0.2 | X | 2.5 | ○ | 0.9 | ○ | 4.1 |
| Ex. 15 | 2,500 | ○ | 0.8 | 0.1 | X | 2.9 | ○ | 0.9 | ○ | 5.5 |
| Ex. 16 | 2,300 | ○ | 0.9 | 0.2 | X | 3.1 | ○ | 1.0 | ○ | 7.6 |
| Ex. 17 | 4,000 | ○ | 0.4 | 0.1 | X | 1.9 | ○ | 0.3 | ○ | 0.5 |
| Ex. 18 | 4,500 | ○ | 0.8 | 0.1 | X | 2.7 | ○ | 0.7 | ○ | 1.5 |
| Ex. 19 | 2,400 | X | 0.7 | 0.1 | ○ | 2.5 | X | Cracking | — | — |
| Ex. 20 | 2,500 | X | 0.6 | 0.1 | ○ | 4.0 | X | 0.7 | — | — |
| Ex. 21 | 3,500 | ○ | 0.6 | 0.1 | ○ | 3.2 | X | 3.5 | X | — |

\* The moisture resistance test conditions in Examples 7 to 18 are 50° C. and a relative humidity of 95%, and the moisture resistance test conditions in other Examples are 80° C. and a relative humidity of 95%.

As shown in Table 2, the ultraviolet-absorbing films prepared in Examples 19 to 21 being comparative examples, cracks were formed, and the mechanical properties were inadequate, although the ultraviolet absorbing ability was obtained. On the other hand, it is evident that the ultraviolet-absorbing films prepared in Examples 1 to 18 being working examples of the present invention, are excellent in the ultraviolet-absorbing ability, and also excellent in mechanical properties such as the abrasion resistance, cracking resistance, etc.

Further, the ultraviolet-absorbing films prepared in Examples 7 to 18 are ones wherein a polyepoxide or glycerin was contained in the coating composition as the film-forming material, and/or a weak acid having a pKa1 of from 1.0 to 5.0 was used as an acid catalyst, and they are ultraviolet-absorbing films excellent in light resistance having formation of cracks or deterioration of the ultraviolet-absorbing ability after the accelerated weather resistance test suppressed. Further, the ultraviolet-absorbing films prepared in Examples 1 to 11 are ones wherein a strong acid (nitric acid) was used as the acid, or a polyepoxide or glycerin was contained in the coating composition as the film-forming material, and in addition, a weak acid (acetic acid) was used as an acid catalyst, and further, fine silica particles and water were incorporated in proper amounts, and it is evident that they have a certain hardness and are excellent in the scratch resistance.

INDUSTRIAL APPLICABILITY

The ultraviolet-absorbing glass article of the present invention has excellent ultraviolet-absorbing property and mechanical durability and is applicable to a site where mechanical durability such as abrasion resistance, cracking resistance, etc. are highly required, such as a door glass plate for automobiles.

This application is a continuation of PCT Application No. PCT/JP2010/058215 filed on May 14, 2010, which is based upon and claims the benefit of priority from Japanese Patent Application No. 2009-118259 filed on May 15, 2009. The contents of those applications are incorporated herein by reference in its entirety.

What is claimed is:

1. An ultraviolet-absorbing glass article comprising:
a glass substrate; and
an ultraviolet-absorbing film formed on at least part of a surface of the glass substrate, the ultraviolet-absorbing film having a thickness of from 1.0 to 8.0 µm,
wherein the ultraviolet-absorbing glass article has a property such that when an abrasion test of 1,000 rotations with a CS-10F abrasive wheel is applied against a surface of the ultraviolet-absorbing film in accordance with JIS-R3212 (1998), an increase in a haze after the abrasion test as compared to before the abrasion test is at most 5.0%, and has a property such that a transmittance of light of the ultraviolet-absorbing glass article at a wavelength of 380 nm is at most 7.6% after a weather resistance test in which the ultraviolet-absorbing glass article is exposed to a xenon lamp under conditions that an illumination intensity in a range of wavelength of 300 to 400 nm is 150 W/m$^2$, a black panel temperature is 83° C., a relative humidity is 50%, and an exposure time is 1000 hours,
wherein the ultraviolet-absorbing film is a cured product of a coating solution which comprises:
(1) a component derived from an epoxidized organooxysilane compound (a) that is 3-glycidoxypropyltrimethoxysilane, 3-glycidoxypropylmethyldimethoxysilane, or a mixture thereof,
(2) a component derived from an organooxysilane compound (b) which is a reaction product of a hydroxylated benzophenone compound and an epoxidized organooxysilane compound that is 3-glycidoxypropyltrimethoxysilane, 3-glycidoxypropylmethyldimethoxysilane, or a mixture thereof, and (3) a component derived from an organooxysilane compound (c) other than the compounds (a) and (b), wherein the component derived from the organooxysilane compound (c) is at least one selected from tetramethoxysilane and tetraethoxysilane, wherein each of the components (1)-(3) is the corresponding organooxysilane compound of the compounds (a), (b) or (c), or a constituting component of a partially hydrolyzed condensate of at least the corresponding organooxysilane compound of the compounds (a), (b) or (c), wherein a content of the component derived from the epoxidized organooxysilane compound (a) is from 5 to 30 parts by mass, a content of the component derived from the organooxysilane compound (b) is from 20 to 50 parts by mass, and a content of the component derived from the organooxysilane compound (c) is from 40 to 60 parts by mass, based on 100 parts by mass of a total solid content of the component derived from the epoxidized organooxysilane compound (a), the component derived from the organooxysilane compound (b), and the component derived from the organooxysilane compound (c), wherein the coating solution further comprises at least one member selected from the group consisting of glycerol polyglycidyl ether, diglycerol polyglycidyl ether, polyglycerol polyglycidyl ether, sorbitol polyglycidyl ether and glycerin in an amount of from 0.1 to 20 parts by mass, based on 100 parts by mass of the total solid content of the component derived from the epoxidized organooxysilane compound (a), the component derived from the organooxysilane compound (b), and the component derived from the organooxysilane compound (c), and wherein the coating solution further comprises at least one acid selected from the group consisting of acetic acid, lactic acid, maleic acid, malonic acid and oxalic acid in an amount of from 0.005 to 5.0 mol/kg as a molar concentration, based on a total mass of the coating solution, of a proton when the primary proton of the at least one acid is completely dissociated.

2. The ultraviolet-absorbing glass article of claim 1, wherein the transmittance of light of the ultraviolet-absorbing glass article at the wavelength of 380 nm is at most 4.1% after the weather resistance test.

3. The ultraviolet-absorbing glass article of claim 1, wherein the transmittance of light of the ultraviolet-absorbing glass article at the wavelength of 380 nm is at most 0.9% after the weather resistance test.

4. The ultraviolet-absorbing glass article of claim 1, wherein the ultraviolet-absorbing film comprises a hindered amine light stabilizer.

5. The ultraviolet-absorbing glass article of claim 1, wherein the ultraviolet-absorbing film comprises fine silica particles.

6. The ultraviolet-absorbing glass article of claim 1, wherein the epoxidized organooxysilane compound (a) is 3-glycidoxypropyltrimethoxysilane, the organooxysilane compound (b) is a reaction product of the hydroxylated benzophenone compound that is 2,2',4,4'-tetrahydroxybenzophenone and the epoxidized organooxysilane compound that is 3-glycidoxypropyltrimethoxysilane, and the organooxysilane compound (c) is a tetramethoxysilane.

7. The ultraviolet-absorbing glass article of claim 1, wherein:
the epoxidized organooxysilane compound (a) is 3-glycidoxypropyltrimethoxysilane;
the organooxysilane compound (b) is a reaction product of the hydroxylated benzophenone compound that is 2,2',4,4'-tetrahydroxybenzophenone and the epoxidized organooxysilane compound that is 3-glycidoxypropyltrimethoxysilane;
the amount of the at least one member selected from the group consisting of glycerol polyglycidyl ether, diglycerol polyglycidyl ether, polyglycerol polyglycidyl ether, sorbitol polyglycidyl ether and glycerin is from 0.1 to 10 parts by mass, based on 100 parts by mass of the total solid content of the component derived from the epoxidized organooxysilane compound (a), the component derived from the organooxysilane compound (b), and the component derived from the organooxysilane compound (c); and
the amount of the at least one acid is from 0.005 to 2.6 mol/kg as the molar concentration, based on the total mass of the coating solution, of the proton when the primary proton of the at least one acid is completely dissociated.

8. The ultraviolet-absorbing glass article of claim 1, wherein:
the epoxidized organooxysilane compound (a) is 3-glycidoxypropyltrimethoxysilane;
the organooxysilane compound (b) is a reaction product of the hydroxylated benzophenone compound that is 2,2',4,4'-tetrahydroxybenzophenone and the epoxidized organooxysilane compound that is 3-glycidoxypropyltrimethoxysilane;
the content of the component derived from the epoxidized organooxysilane compound (a) is from 5 to 19.5 parts by mass, the content of the component derived from the organooxysilane compound (b) is from 20 to 40 parts by mass, and the content of the component derived from the organooxysilane compound (c) is from 45 to 60 parts by mass, based on 100 parts by mass of the total solid content of the component derived from the epoxidized organooxysilane compound (a), the component derived from the organooxysilane compound (b), and the component derived from the organooxysilane compound (c);
the amount of the at least one member selected from the group consisting of glycerol polyglycidyl ether, diglycerol polyglycidyl ether, polyglycerol polyglycidyl ether, sorbitol polyglycidyl ether and glycerin is from 0.1 to 10 parts by mass, based on 100 parts by mass of the total solid content of the component derived from the epoxidized organooxysilane compound (a), the component derived from the organooxysilane compound (b), and the component derived from the organooxysilane compound (c); and
the amount of the at least one acid is from 0.005 to 2.6 mol/kg as the molar concentration, based on the total mass of the coating solution, of the proton when the primary proton of the at least one acid is completely dissociated.

9. The ultraviolet-absorbing glass article of claim 1, wherein the coating solution further comprises from 0.5 to 50 parts by mass of fine silica particles, based on 100 parts by mass of the total solid content of the component derived from the epoxidized organooxysilane compound (a), the component derived from the organooxysilane compound (b), and the component derived from the organooxysilane compound (c), and from 8 to 20 equivalents by molar ratio of water to the amount, calculated as $SiO_2$, of the component derived from the organooxysilane compound (c).

10. The ultraviolet-absorbing glass article of claim 1, wherein the content of the component derived from the organooxysilane compound (c) in the coating solution is from 1 to 10 mass % as $SiO_2$ content when silicon atoms contained in this component are calculated as $SiO_2$.

11. An automobile window comprising the ultraviolet-absorbing glass article of claim 1.

* * * * *